United States Patent
Carrier et al.

(10) Patent No.: US 7,719,234 B2
(45) Date of Patent: May 18, 2010

(54) METHODS OF DISCHARGE CONTROL FOR A BATTERY PACK OF A CORDLESS POWER TOOL SYSTEM, A CORDLESS POWER TOOL SYSTEM AND BATTERY PACK ADAPTED TO PROVIDE OVER-DISCHARGE PROTECTION AND DISCHARGE CONTROL

(75) Inventors: David A. Carrier, Aberdeen, MD (US); Bhanuprasad V. Gorti, Abingdon, MD (US); Danh Thanh Trinh, Parkville, MD (US); R. Roby Bailey, New Park, PA (US); Andrew E. Seman, Jr., White Marsh, MD (US); Daniele C. Brotto, Baltimore, MD (US); Fred S. Watts, New Freedom, PA (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 12/150,458

(22) Filed: Apr. 28, 2008

(65) Prior Publication Data

US 2008/0203995 A1    Aug. 28, 2008

Related U.S. Application Data

(62) Division of application No. 10/954,222, filed on Oct. 1, 2004, now abandoned.

(60) Provisional application No. 60/507,955, filed on Oct. 3, 2003, provisional application No. 60/510,125, filed on Oct. 14, 2003, provisional application No. 60/540,323, filed on Feb. 2, 2004.

(51) Int. Cl.
*H02J 7/00* (2006.01)

(52) U.S. Cl. ........................................ 320/135; 320/112

(58) Field of Classification Search ................. 320/106, 320/109, 110, 112, 141, 135
See application file for complete search history.

(56) References Cited

U.S. PATENT DOCUMENTS

| | | | |
|---|---|---|---|
| 5,146,150 A | 9/1992 | Gyenes et al. | |
| 5,680,027 A | 10/1997 | Hiratsuka et al. | |
| 6,020,721 A | 2/2000 | Brotto | |
| 6,054,843 A | 4/2000 | Oglesbee et al. | |
| 6,087,815 A * | 7/2000 | Pfeifer et al. | 323/282 |
| 6,492,791 B1 | 12/2002 | Saeki et al. | |
| 2002/0149346 A1 | 10/2002 | Sakakibara | |
| 2003/0096158 A1 | 5/2003 | Takano et al. | |

FOREIGN PATENT DOCUMENTS

| | | |
|---|---|---|
| JP | 11 317246 A | 11/1999 |
| WO | WO01/39351 | 5/2001 |

* cited by examiner

*Primary Examiner*—Bao Q Vu
*Assistant Examiner*—Jue Zhang
(74) *Attorney, Agent, or Firm*—Harness, Dickey & Pierce, P.L.C.

(57) ABSTRACT

In a cordless power tool system, a battery pack which may removably attachable to a cordless power tool and to a charger may include at least one battery cell and a power limiting device. The power limiting device may be arranged in series with the at least one battery cell for limiting power output of the battery pack based on the component that is connected to the pack. Current and hence power out of the battery pack may be controlled as a function of total internal impedance in the battery pack, which may be adjusted depending on the component that is connected to the pack.

14 Claims, 20 Drawing Sheets

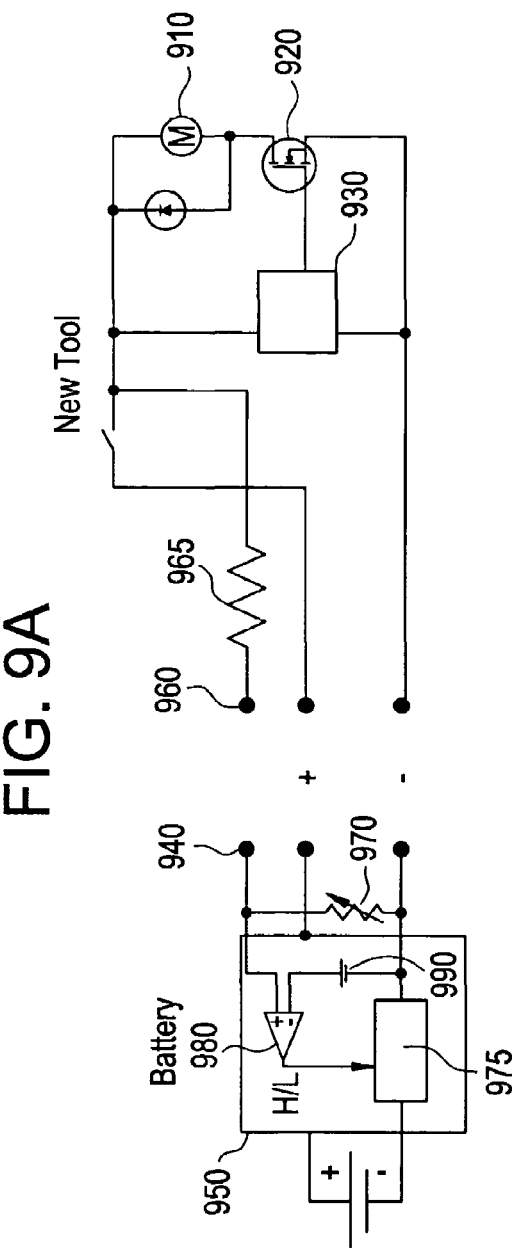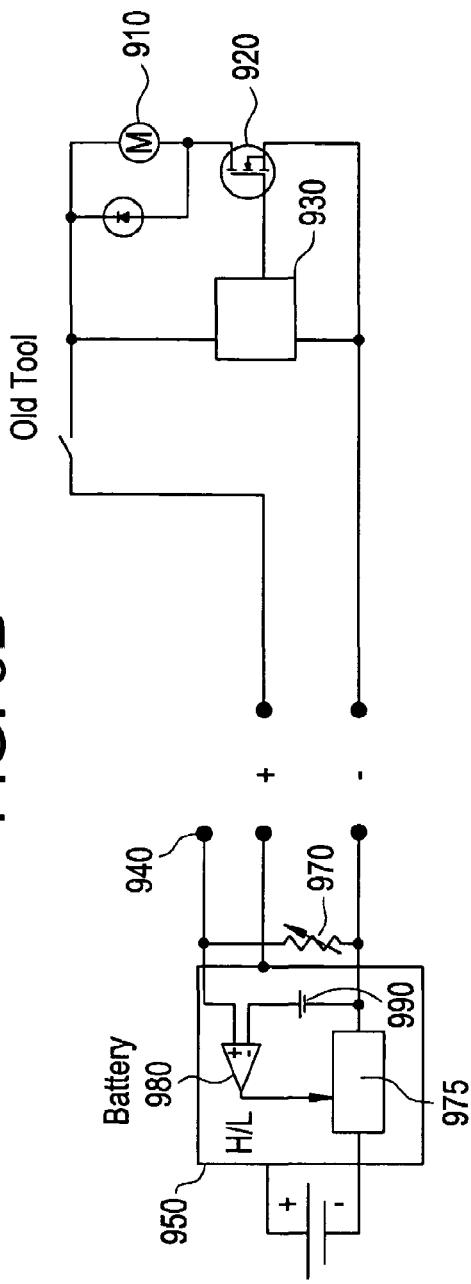

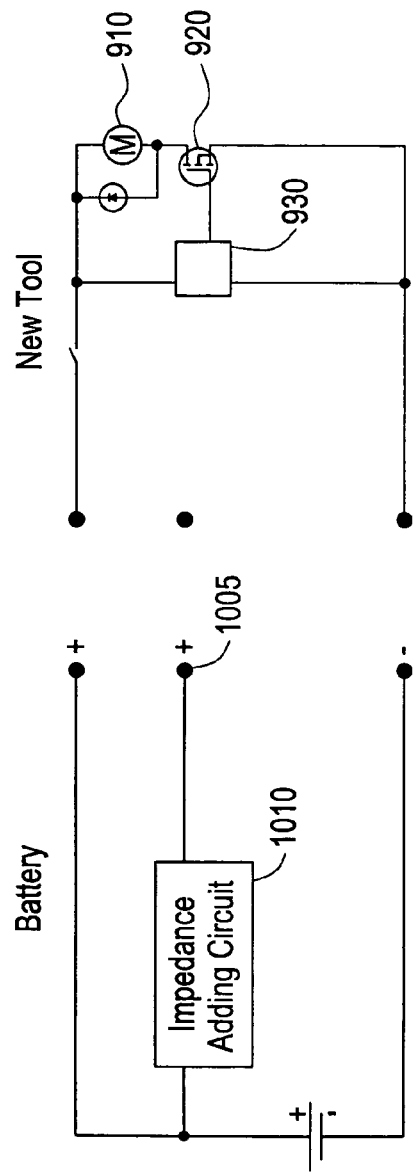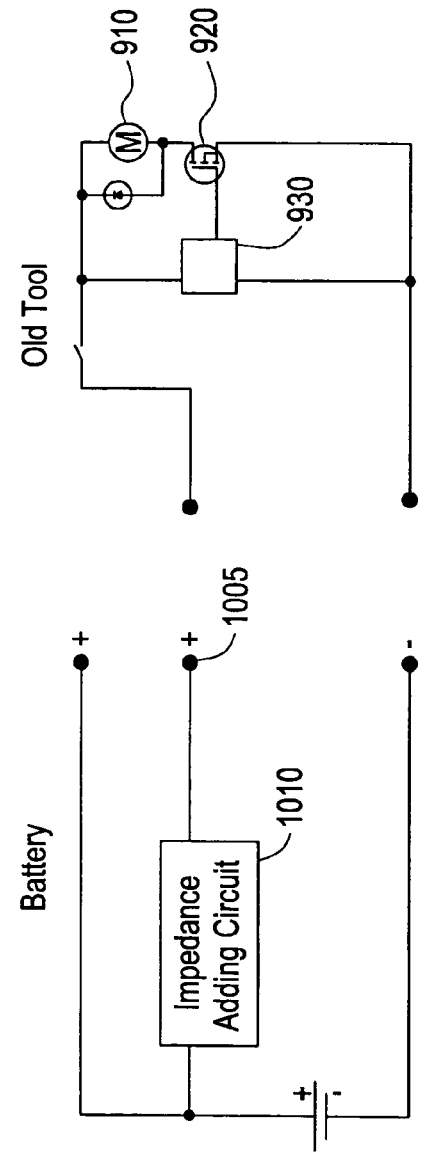

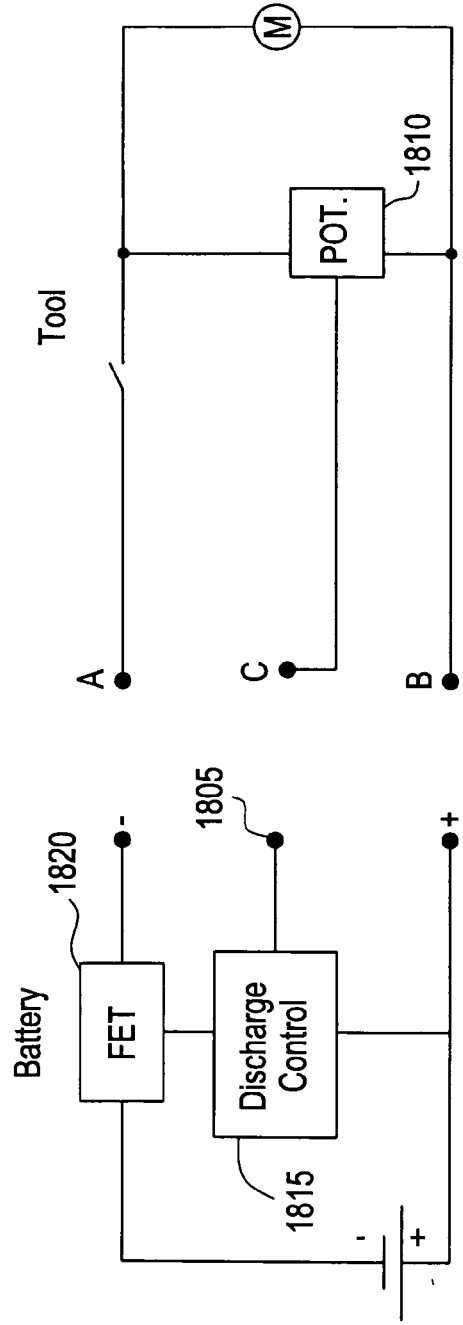
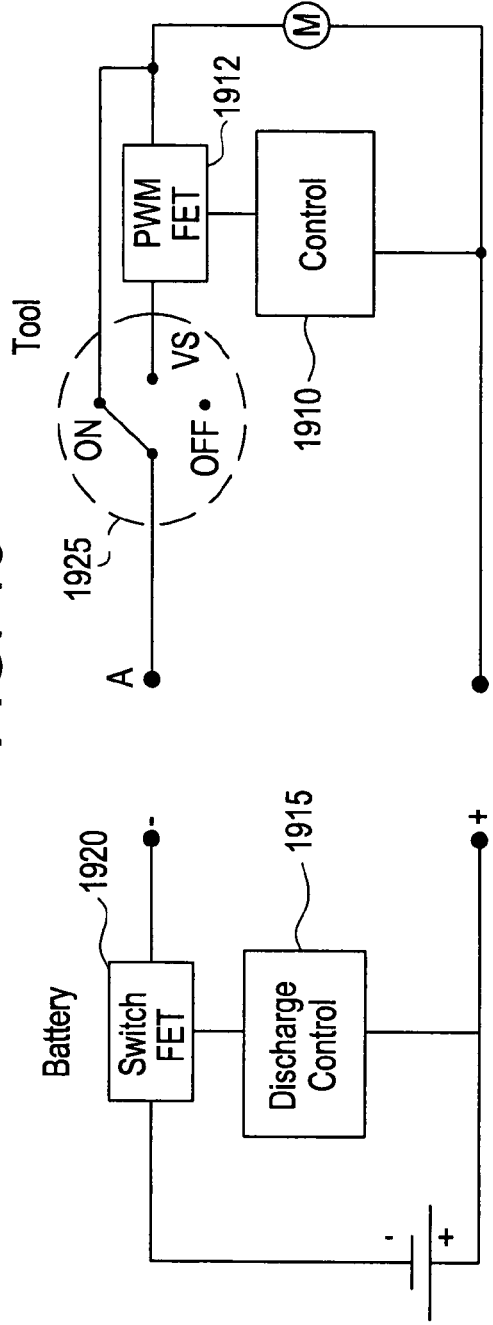

US 7,719,234 B2

METHODS OF DISCHARGE CONTROL FOR A BATTERY PACK OF A CORDLESS POWER TOOL SYSTEM, A CORDLESS POWER TOOL SYSTEM AND BATTERY PACK ADAPTED TO PROVIDE OVER-DISCHARGE PROTECTION AND DISCHARGE CONTROL

CROSS-REFERENCE TO RELATED APPLICATIONS

This application is a divisional of U.S. patent application Ser. No. 10/954,222 filed on Oct. 1, 2004 which claims the benefit of U.S. Provisional Application No. 60/507,955, filed on Oct. 3, 2003, U.S. Provisional Application No. 60/510,125, filed on Oct. 14, 2003, and U.S. Provisional Application Ser. No. 60/540,323, filed Feb. 2, 2004. The entire contents of the disclosures for each of these applications are incorporated herein by reference.

BACKGROUND OF THE INVENTION

1. Field of the Invention

The present invention relates to methods of discharge control for rechargeable batteries, to a cordless power tool system adapted to provide over-discharge protection and discharge control for an attached battery pack, and to a battery pack including discharge control and over-discharge protection circuits and components.

2. Description of Related Art

Over the past few years, lithium-ion (Li-ion) batteries have begun replacing nickel-cadmium (NiCd), nickel-metal-hydride (NiMH), and lead-acid batteries in low-voltage, portable electronic devices such as notebook-type personal computers. As compared to NiCd and NiMH batteries, Li-ion batteries are lighter but have a larger capacity per unit volume. For this reason, the Li-ion batteries have been typically suitable to low-voltage devices that are preferably light and which are required to endure continuous use for a long time. In an over-discharged state, however, the Li-ion batteries deteriorate rapidly, thus Li-ion batteries require over-discharge protection.

A battery pack used in a portable electronic device typically has a plurality of battery cells connected in series. The maximum number of battery cells connected in series in one battery pack is determined by the relationship between the output voltage of the battery pack and a power source voltage supplied from outside at the time of charging. For instance, the typical output voltage of one NiCd battery cell or one NiMH battery cell is 1.2 V, and the power source voltage supplied at the time of charging is approximately 1.7 V. Assuming that an 18V output voltage from a battery pack is suitable for most general purpose electronic devices, the maximum number of NiCd or NiMH battery cells connected in series in the battery pack is 15. On the other hand, the typical output voltage of one Li-ion battery cell is approximately 3.6 V. Accordingly, the maximum number of Li-ion battery cells connected in series in one fictional 18V Li-ion battery pack would be 5.

Unlike a NiCd battery pack and a NiMH battery pack, the Li-ion battery pack may include functionality to protect against fault conditions inside and outside the Li-ion battery pack. This prevents cells in the Li-ion battery pack from deteriorating and shortening useful life of the pack. For instance, if a fault condition such as short-circuiting occurs inside or outside the Li-ion battery pack, a fuse may be provided to cut off an over-discharging current or an over-charging current, if the discharging current or charging current becomes larger than a given current level.

Charge/discharge control and over-discharge protection for secondary batteries such as Li-ion batteries may be described in U.S. Pat. No. 6,492,791 to Saeki et al. FIG. 1 is a block diagram of a prior art battery unit from the '791 patent. The battery unit 1 is mounted on an electronic device 11 and supplies power to the electronic device 11. The battery unit 1 includes battery cells E1, E2, and E3, a voltage monitor circuit 101, a fuse 102, p-channel Field Effect Transistors (FETs) 103 and 104, and power supply terminals 105 and 106.

The electronic device 11 includes a DC-DC converter 12, a device main body 13, a voltage monitor circuit 14, a regulator 15, a main switch 16, and a reset switch 17. The DC-DC converter 12 is connected to the power source terminal 105 of the battery unit 1, and converts the voltage supplied from the battery unit 1 to a desired voltage. The DC-DC converter 12 is also connected to the regulator 15, and converts the voltage supplied from the regulator 15 to a desired voltage.

The voltage converted by the DC-DC converter 12 is supplied to the device main body 13 via the main switch 16. The main switch 16 is turned on to supply the voltage converted by the DC-DC converter 12 to the device main body 13. The main switch 16 is interlocked with the reset switch 17, so that when the main switch 16 is turned on, the reset switch 17 is also turned on.

FIG. 2 is a circuit diagram of a voltage monitor circuit for the prior art battery unit of FIG. 1. As shown in FIG. 2, the voltage monitor circuit 101 comprises an overcharge monitor circuit 101$a$ and an over-discharge monitor circuit 101$b$. The overcharge monitor circuit 101$a$ monitors whether the battery cells E1, E2, and E3 are in an overcharged state, and switches off the FET 103 when the battery cells are in an overcharged state. The over-discharge monitor circuit 101$b$ monitors whether the battery cells E1, E2, and E3 are in an over-discharged state, and switches off the FET 104 when the battery cells E1, E2, and E3 are in an over-discharged state.

The overcharge monitor circuit 101$a$ includes a comparator 121 that compares the voltage of the battery cell E1 with a reference voltage $V_{ref1}$ generated by a reference power source $e_{1a}$. If the voltage of the battery cell E1 is higher than the reference voltage $V_{ref1}$, the comparator 121 outputs "1". If the voltage of the battery cell E1 is lower than the reference voltage $V_{ref1}$, the comparator 121 outputs "0". Here, "1" indicates that the output of a comparator is at the high logic level, and "0" indicates that the output of a comparator is at the low logic level. Similarly, for cell E2, comparator 122 outputs a "1" if voltage of the battery cell E2 is higher than reference voltage $V_{ref1}$ generated by reference power source $e_{1b}$, else it outputs a "0". Further, comparator 123 compares the voltage of battery cell E3, and outputs "1", or "0", depending on whether the voltage of battery cell E3 is higher or lower than the reference voltage $V_{ref1}$ generated by reference power source $e_{1c}$.

The outputs of the comparators 121, 122, and 123 are subject to an OR operation at an OR gate 124, which supplies a result of the OR operation to the gate of the FET 103. If any of the outputs of the comparators 121, 122, and 123 is "1", i.e., if any of the battery cells E1, E2, and E3 is in an overcharged state and the signal supplied from the OR gate 124 to the gate of the FET 103 is "1", the FET 103 is switched off so as to prevent overcharge.

The over-discharge monitor circuit 101$b$ includes a comparator 111 that compares the voltage of the battery cell E1 with a reference voltage $V_{ref2}$ generated by the reference power source $e_{2a}$. If the voltage of the battery cell E1 is higher than the reference voltage $V_{ref2}$, the comparator 111 outputs "0". If the voltage of the battery cell E1 is lower than the reference voltage $V_{ref2}$, the comparator 111 outputs "1". Similarly, comparator 112 compares the voltage of the battery cell E2 with a reference voltage $V_{ref2}$ generated by the reference power source $e_{2b}$. If the voltage of the battery cell E2 is higher than the reference voltage $V_{ref2}$, the comparator 112 outputs "0". If the voltage of the battery cell E2 is lower than the reference voltage $V_{ref2}$, the comparator 112 outputs "1". The functions of comparator 113 are also similar; the comparator 113 outputs "0" if voltage of the E3 cell is higher than $V_{ref2}$ generated by reference power source $e_{2c}$, else comparator 113 outputs "1".

The outputs of the comparators 111, 112, and 113 are subject to an OR operation at an OR gate 114, which supplies a result of the OR operation to the gate of the FET 104. If any of the outputs of the comparators 111, 112, and 113 is "1", i.e., if any of the battery cells E1, E2, and E3 is in an over-discharged state and the signal supplied from the OR gate 114 to the gate of the FET 104 is "1", the FET 104 is switched off so as to prevent over-discharge of the battery unit 1.

FIG. 3 is a circuit diagram of the discharge control circuit 2 in the prior art battery unit of FIG. 1. FIG. 3 is provided to illustrate the relation between discharge control circuit 2 and over-discharge monitor circuit 101b.

The discharge control circuit 2 includes a flip-flop 5 that has a set terminal and a reset terminal. The output of the flip-flop 5 is set at "1" when its set terminal is set at "1". The output of the flip-flop 5 is reset at "0" when its reset terminal is set at "1". The set terminal 3 is connected to the set terminal of the flip-flop 5, and the output of an OR gate 6 is supplied to the reset terminal of the flip-flop 5.

The OR gate 6 is supplied with a reset signal applied to the reset terminal 4 and the output of a comparator 8 so as to perform an OR operation on the reset signal and the output of the comparator 8. The comparator 8 detects a voltage between the source and the drain of the charge control FET 103. If the voltage between the source and the drain is higher than a threshold value, the comparator 8 outputs a high-level signal. If the voltage between the source and the drain is lower than the threshold value, the comparator 8 outputs a low-level signal. In this manner, the comparator 8 judges whether the charging voltage is higher than a predetermined level or not from the voltage between the source and the drain of the charge control FET 103, thereby resetting the flip-flop 5.

When the flip-flop 5 is set and the discharge control FET 104 is OFF before charging, the comparator 8 also detects electrification from the voltage between the source and the drain of the charge control FET 103. If electrification is detected, the flip-flop 5 is reset, the output of the flip-flop 5 becomes "low", and the discharge control FET 104 is turned on.

When the set terminal 3 becomes "1", the flip-flop 5 outputs "1". When the output of the reset terminal 4 or the output of the comparator 8 becomes "1", the flip-flop 5 outputs "0". The output of the flip-flop 5 is supplied to an OR gate 7. The OR gate 7 is supplied with the output of the over-discharge control circuit 101b as well as the output of the flip-flop 5. The OR gate 7 performs an OR operation on the output of the flip-flop 5 and the output of the over-discharge control circuit 101b.

The output of the OR gate 7 is supplied to the discharge control FET 104. The discharge control FET 104 is OFF when the output of the OR gate 7 is "1", and is ON when the output of the OR gate is "0". In other words, when the flip-flop 5 is set, the discharge control FET 104 becomes "1" and is turned off. When the flip-flop 5 is reset and outputs "0", the discharge control FET 104 is turned on or off depending on the output of the over-discharge control circuit 101b.

The above-described battery unit with charge/discharge control and over-discharge protection is designed primarily for low-voltage portable electronic devices such as notebook-type personal computers, cellular phones, etc., which require voltage generally on the order of 2 to 4 volts. Such devices are characterized by using battery packs composed of cells (such as Li-ion, NiCd, NiMH cells) that provide a maximum output voltage of about 4.2 volts/cell.

However, much higher voltages than described above are required for higher-power electronic devices such as cordless power tools. Accordingly, higher-power battery packs may be in the process of being developed for cordless power tools. Such "high-power" battery packs may provide higher voltage outputs than conventional NiCd and NiMH battery packs (and substantially higher power than conventional Li-ion packs used for PCs and cell phones), and at a much reduced weight (as compared to conventional NiCd or NiMH battery packs used as power sources in conventional cordless power tools). A characteristic of these battery packs is that the battery packs may exhibit substantially lower impedance characteristics than conventional NiCd, NiMH and/or even the lower power Li-ion packs.

However, as this battery technology advances the introduction of lower impedance chemistries (such as lithium-ion chemistry) and construction styles to develop secondary batteries generating substantially higher output voltages then about 4.2 volts/cell may possibly create compatibility issues with existing cordless power tools. As total internal pack impedance drops, the pack can supply substantially higher current to an attached electronic component, such as a power tool. As current through a tool motor of the attached tool increases, demagnetization forces (e.g., the number of armature turns of the motor times the current, ampere-turns) could substantially increase beyond a desired or design limit in the motor. Such undesirable demagnetization could thus potentially burn up the tool motor.

For example, a lower impedance electrical source could cause damage to a tool's motor when the tool is held at stall condition. During motor stall, the motor and battery impedances are the only mechanisms to limit the current since there is no back-EMF created by the motor. With a lower impedance pack, the currents would be higher. Higher currents through the motor might cause a stronger de-magnetization force than what the tool's permanent magnets were designed to withstand. Additionally, start-up of the tool could produce excessive starting currents and cause demagnetization of the motor. Thermal overload could also be a result of using a low impedance electrical source in an existing power tool, as the new batteries may be designed to run longer and harder than what the original cordless tool system was designed. Accordingly, over-discharge and/or other current limiting controls may need to be in place before these developing lower-impedance batteries may be used with existing cordless power tools, for example.

SUMMARY OF THE INVENTION

In general, exemplary embodiments of the present invention are directed to a cordless power tool system, battery pack and to method of providing discharge control in the system and/or battery pack. In an exemplary cordless power tool system, a battery pack, which may removably attachable to a cordless power tool and to a charger of the system, may include at least one battery cell and a power limiting device.

The power limiting device may be arranged in series with the at least one battery cell for limiting power output of the battery pack based on the component that is connected to the pack. Current and hence power out of the battery pack may be controlled as a function of a total internal impedance of the battery pack, which may be adjusted depending on the component that is connected to the pack.

BRIEF DESCRIPTION OF THE DRAWINGS

The present invention will become more fully understood from the detailed description given herein below and the accompanying drawings, wherein like elements are represented by like reference numerals and prime and multiple prime notation indicates similar elements in alternate embodiments, which are given by way of illustration only and thus are not limitative of the present invention.

FIGS. 9A and 9B are block diagrams illustrating a thermistor contact arrangement to determine a desired impedance mode for a given tool in accordance with an exemplary embodiment of the present invention.

FIGS. 10A and 10B are block diagrams illustrating additional contact arrangements for determining a desired impedance mode for a given tool in accordance with an exemplary embodiment of the present invention.

FIG. 18 is a block diagram illustrating discharge control of a battery pack in conjunction with speed control of an attached tool in accordance with an exemplary embodiment of the present invention.

FIG. 19 is a block diagram illustrating discharge control of a battery pack in conjunction with speed control of an attached tool in accordance with another exemplary embodiment of the present invention.

DETAILED DESCRIPTION OF THE EXEMPLARY EMBODIMENTS

Figure 1:
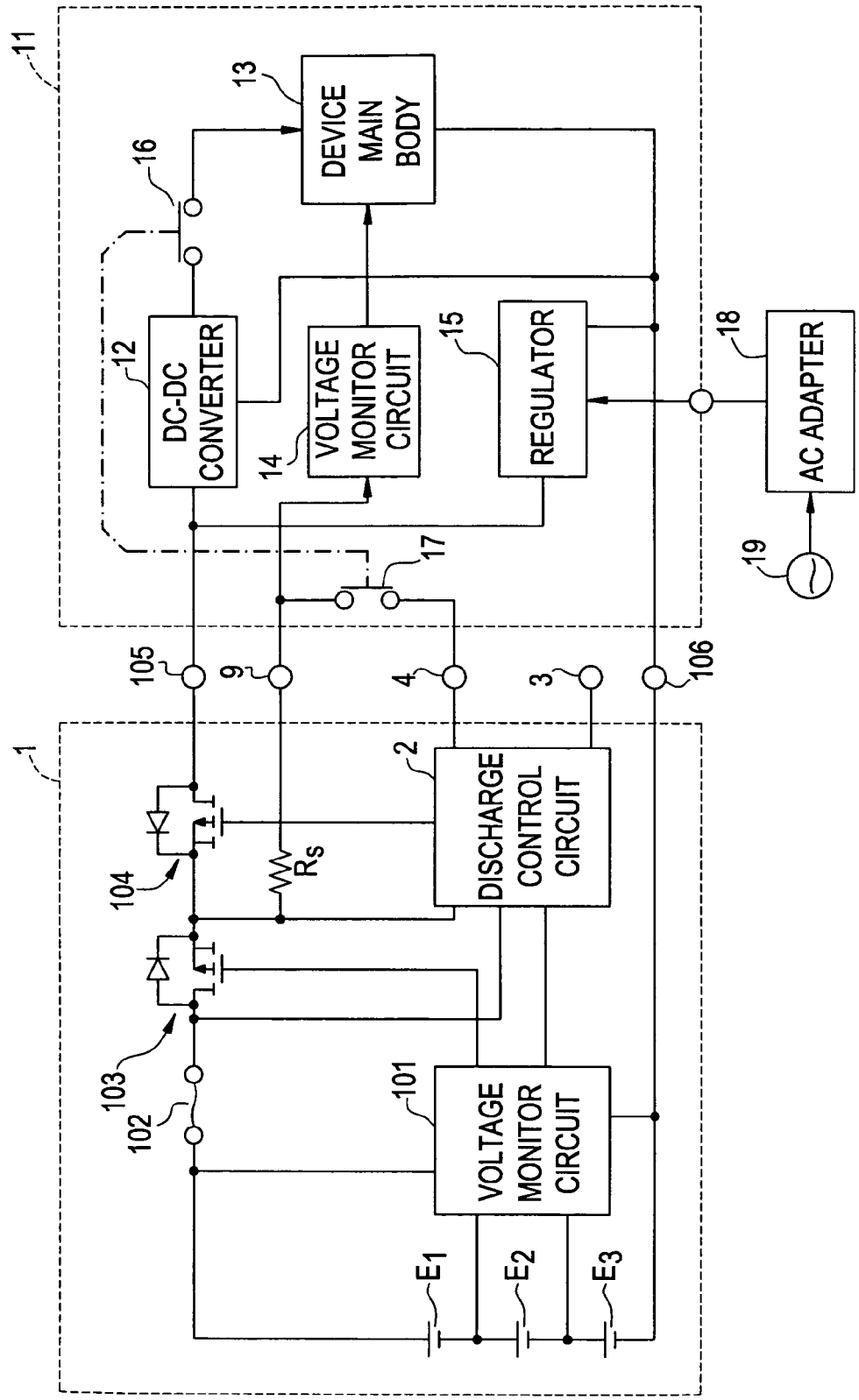
FIG. 1 is a block diagram of a prior art battery unit.
Figure 2:
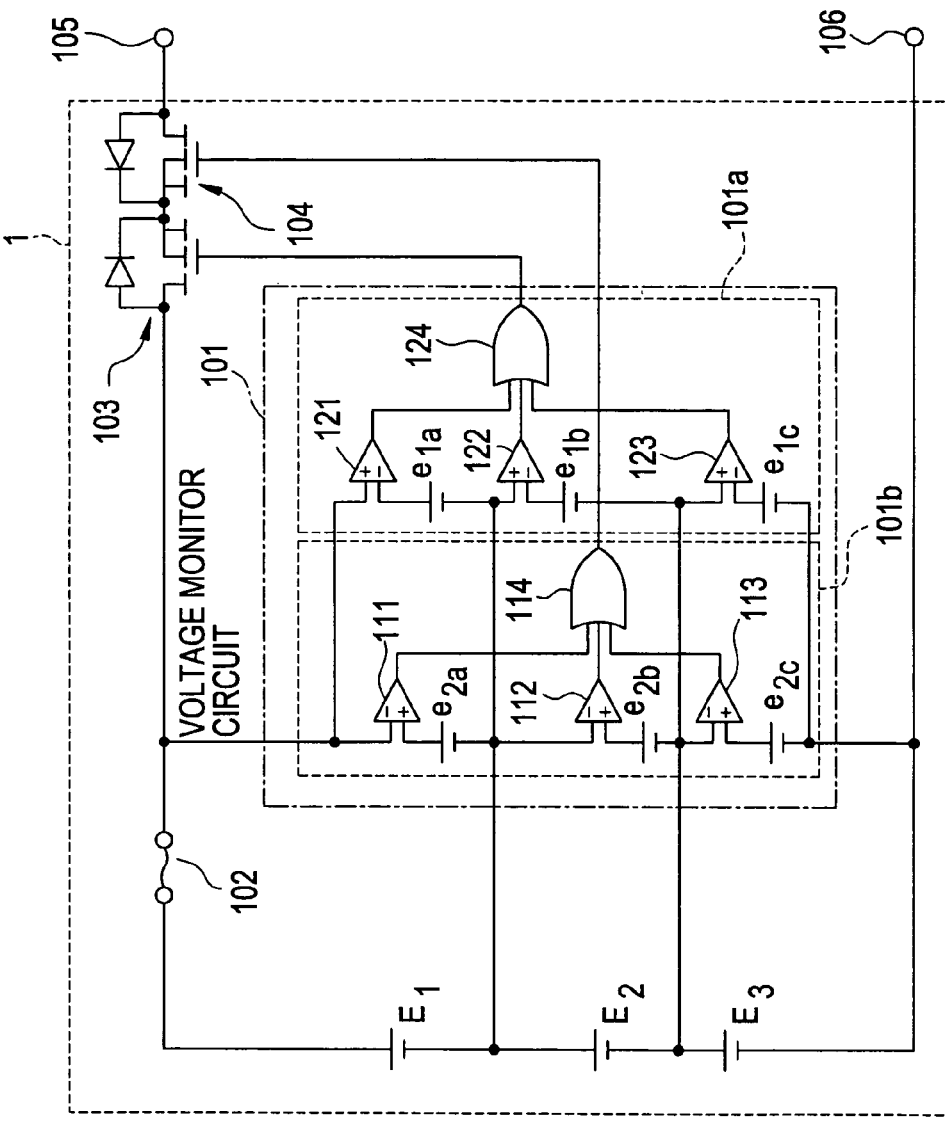
FIG. 2 is a circuit diagram of a voltage monitor circuit for the prior art battery unit of FIG. 1.
Figure 3:
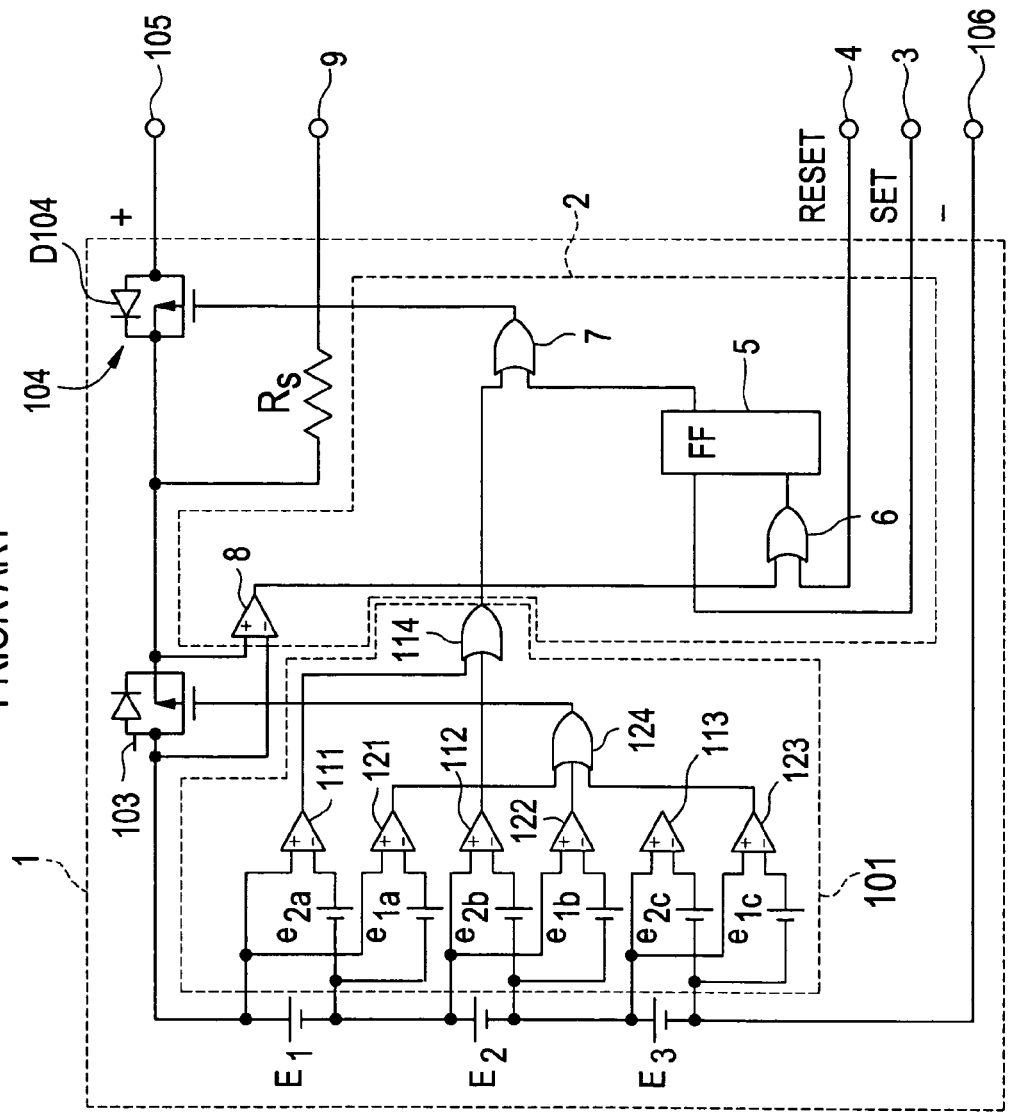
FIG. 3 is a circuit diagram of prior art discharge control circuit.

With general reference to the drawings, a system of cordless power tools constructed in accordance with the teachings of exemplary embodiments of the present invention is illustrated. Exemplary cordless power tools of the system are shown to include, by way of examples, a circular power saw 10 (FIG. 22), a reciprocating saw 20 (FIG. 23) and a drill 30 (FIG. 24). The tools 10, 20 and 30 each may include a conventional DC motor (not shown) adapted to be powered by a power source having a given nominal voltage rating. In the exemplary embodiments, the tools 10, 20 and 30 may be driven by a removable power source having a nominal voltage rating of at least 18 volts. It will become evident to those skilled that the present invention is not limited to the particular types of tools shown in the drawings nor to specific voltages. In this regard, the teachings of the present invention may be applicable to virtually any type of cordless power tool and any supply voltage.

With continued reference to the drawings, the removable power source which may be embodied as a battery pack 40. In the exemplary embodiments illustrated, the battery pack may be a rechargeable battery pack 40. Battery pack 40 may include a plurality of battery cells connected in series, and/or a plurality of serially-connected strings of cells, in which the strings are in parallel with one another. For purposes of describing the exemplary embodiments of the present invention, battery pack 40 may be composed of cells having a lithium-ion cell chemistry. As the exemplary embodiments are directed to the cordless power tool environment, which requires power sources having much higher voltage ratings than conventional low voltage devices using Li-ion battery technology, (such as laptop computers and cellular phones) the nominal voltage rating of the battery pack 40 may be at least 18V.

However, pack 40 may be composed of cells of another lithium-based chemistry, such as lithium metal or lithium polymer, or other chemistry such as nickel cadmium (NiCd), nickel metal hydride (NiMH) and lead-acid, for example, in terms of the chemistry makeup of individual cells, electrodes and electrolyte of the pack 40.

As used hereafter, the term 'lower-impedance battery pack' may be defined as a battery pack which is intended to supplement or replace existing, conventional battery packs in a cordless power tool system. A lower-impedance battery pack, such as the aforementioned Li-ion battery pack, may occasionally be referred to as a 'first' battery pack hereafter, and may be applicable for the pack 40 in any of the exemplary cordless power tool systems illustrated in FIGS. 22-24 and equivalent power tool systems. An existing battery pack for cordless power tools, such as a conventional NiCd or NiMH battery pack, may occasionally be referred to hereafter as a 'standard' battery pack or 'second' battery pack hereafter for purposes of clarity and distinction from the lower impedance battery pack.

The lower impedance battery pack may produce at least a similar output voltage (and/or preferably higher voltages) but has lower internal pack impedance as compared to the standard battery pack. This lower internal impedance is designed to allow the use of higher charge and discharge currents with less voltage drop and thermal heating of the pack, then possible with standard battery packs currently used in cordless power tool systems. Accordingly, the lower impedance battery pack may provide higher current and hence higher power, due to its lower total internal pack impedance to power a cordless power tool, as compared to its counterpart standard battery pack.

Figure 22:
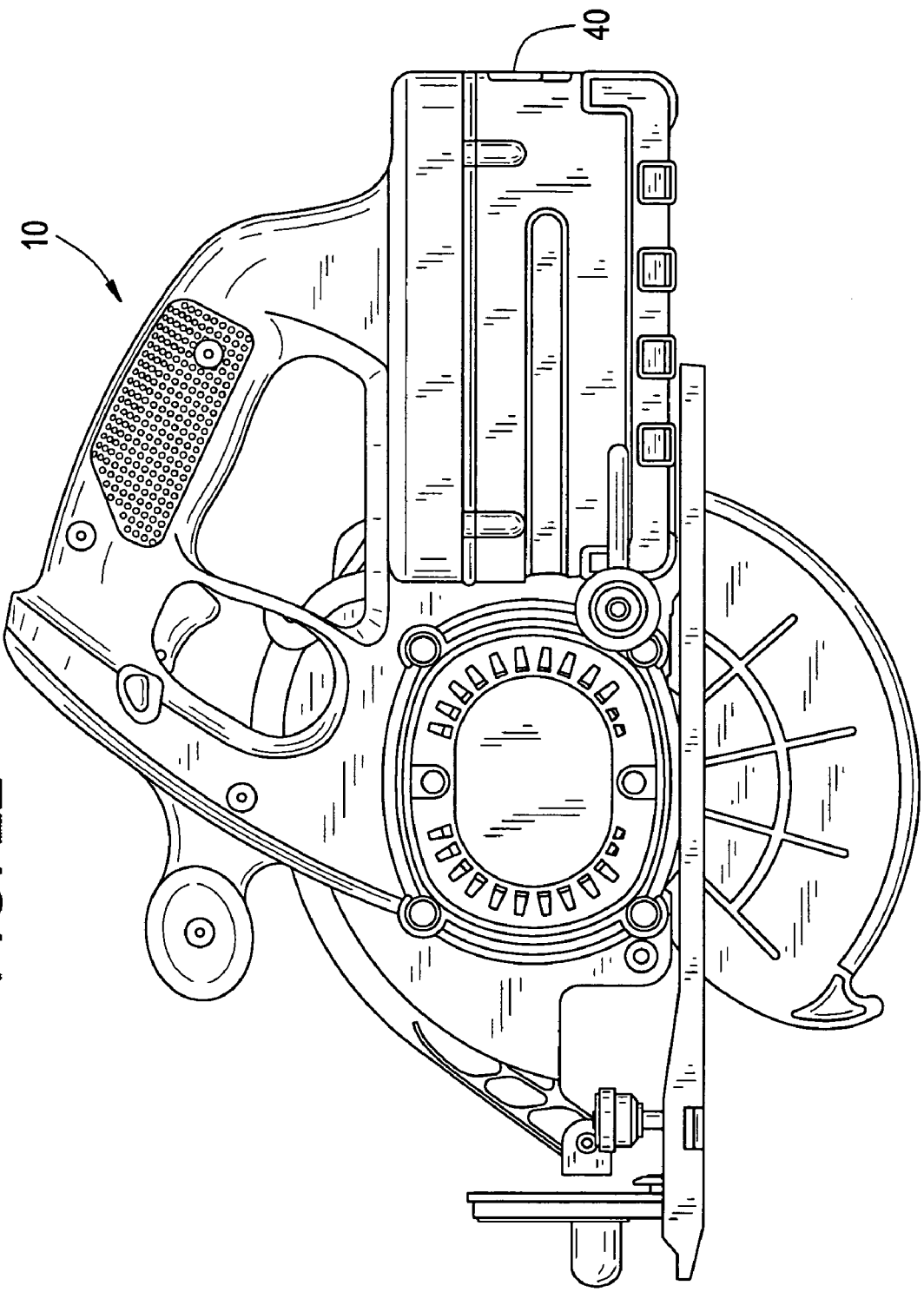
FIGS. 22-24 illustrate exemplary cordless power tools of a cordless power tool system in accordance with an exemplary embodiment of the present invention.
Figure 23:
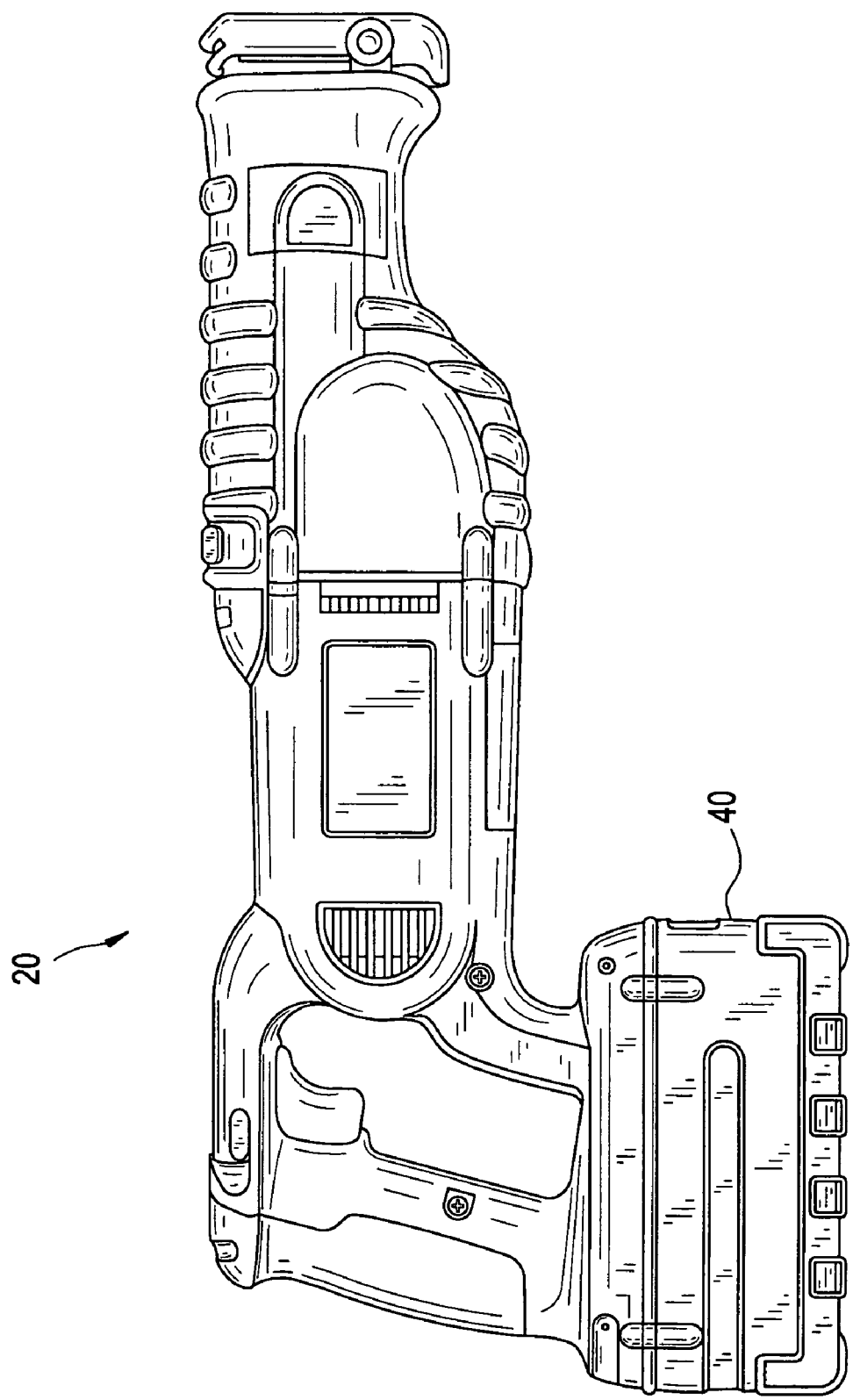
Figure 24:
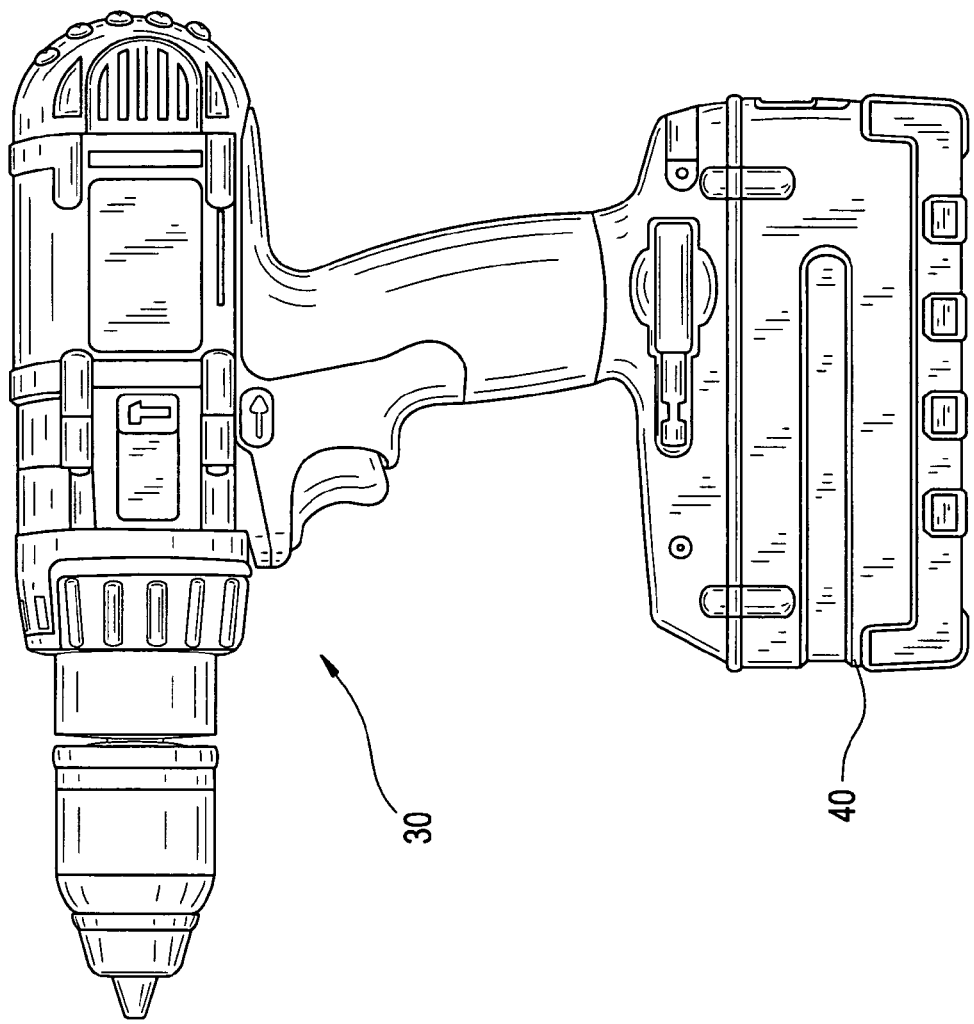

The term 'new tool' (occasionally also referred to also as a 'first power tool') may be defined as a cordless power tool that is designed for and capable of operating with the aforementioned lower-impedance battery packs as part of a cordless power tool system as shown in the exemplary FIGS. 22-24, for example. The first power tool may preferably be compatible with an existing cordless tool system. Accordingly, the new or first power tools, when attached to the lower impedance battery pack, may operate at higher currents, and hence power levels (due to the lower internal pack impedance in the attached lower-impedance pack) than is possible in the existing cordless power tool systems, where the existing power tool is powered by the standard battery pack. Further, the first power tool may be adapted to communicate one or more of a power limit, current limit and/or voltage limitation for the power tool to an attached lower impedance battery pack. Intelligence or electronics provided in one or both of the lower impedance battery pack and first power tool may enable such communication, for example.

The existing cordless power tool system may consist of a charger, standard battery pack for a cordless power tool (i.e., NiCd, NiMH, etc.) and various power tools that meet each other components' design specifications and capabilities. The power tools for the existing cordless power tool system may be occasionally referred to as an 'old' or 'second' power tool for purposes of clarity and distinction from the new or first power tool.

The second power tool hence is designed to operate with the standard battery pack at lower currents, which thus may output lower current and hence power, due to its higher total internal pack impedance than the first battery pack. Conversely, the first battery pack may thus be characterized as providing a higher current and a higher power, because of its lower internal impedance, than the second, standardized battery pack that is designed to operate with the conventional, second power tool.

Several solutions may be possible to allow use of these new lower-impedance battery packs. Firstly, the new lower-impedance battery packs could be locked out from an existing power tool base, perhaps by reconfiguring the pack to tool interface so as to prevent use with existing tools. Secondly, an upgrade kit could be sold for integration with the tool motor or tool electronics, so as to provide a mechanism for enabling the existing power tool to withstand the new lower-impedance battery pack's more extreme capabilities. An exemplary upgrade kit might include a new or replacement tool motor with thicker magnets to handle the higher magnetic fields that are produced at stall when using a lower-impedance battery pack.

Another alternative may be to limit the peak current out of the lower-impedance battery pack and/or to increase the effective impedance of the battery pack so that it matches today's design capabilities for the standard battery pack and existing cordless power tool system. Limiting the peak current out of a lower-impedance battery is designed to prevent excessive currents during heavy loading or start-up conditions.

Other damage to an attached tool may occur by the excessive power capability of the lower-impedance battery pack. At a given current, i.e., 40 amps, a lower-impedance battery pack will have less voltage drop inside the pack than a standard battery pack. While the standard battery pack may have an output voltage of 12 volts (from a no-load voltage of 18 volts), the lower-impedance battery pack (with at least half the internal impedance of the standard battery pack) would have an output voltage of about at least 15 volts under the same 40 Amp discharge current. A tool motor powered by a standard battery pack is controlling about 480 watts of input power, while the same motor powered by a lower-impedance pack would be controlling about at least 600 watts of input power.

Obviously, in this example, the second or old power tool should be able to handle the higher power capability, if it is to be used with the lower-impedance battery pack. With this in mind, it is thus desirable to limit the power that the lower-impedance battery pack can deliver for existing old tools that have not been designed for the higher power levels. In an aspect, following disclosure may detail how peak current out of the lower-impedance battery pack may be limited, and/or how the effective internal impedance of the battery pack may be raised so that the lower-impedance battery pack may be used with both existing and developing, higher power output tool systems.

Figure 4A:
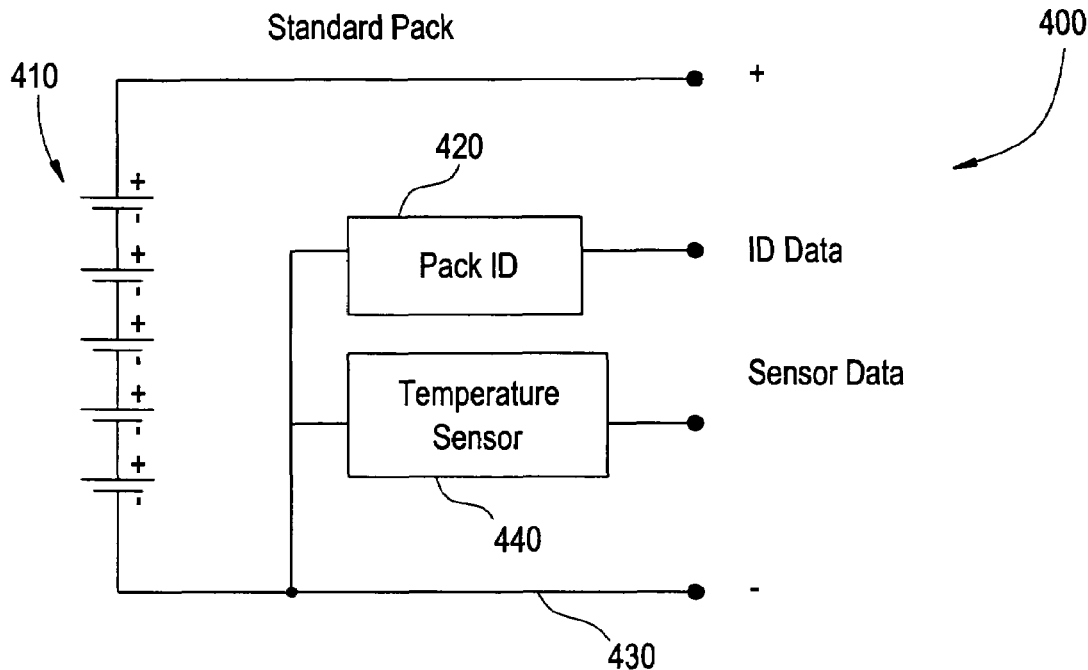
FIG. 4A is a block diagram illustrating an existing, standard battery pack.
Figure 4B:
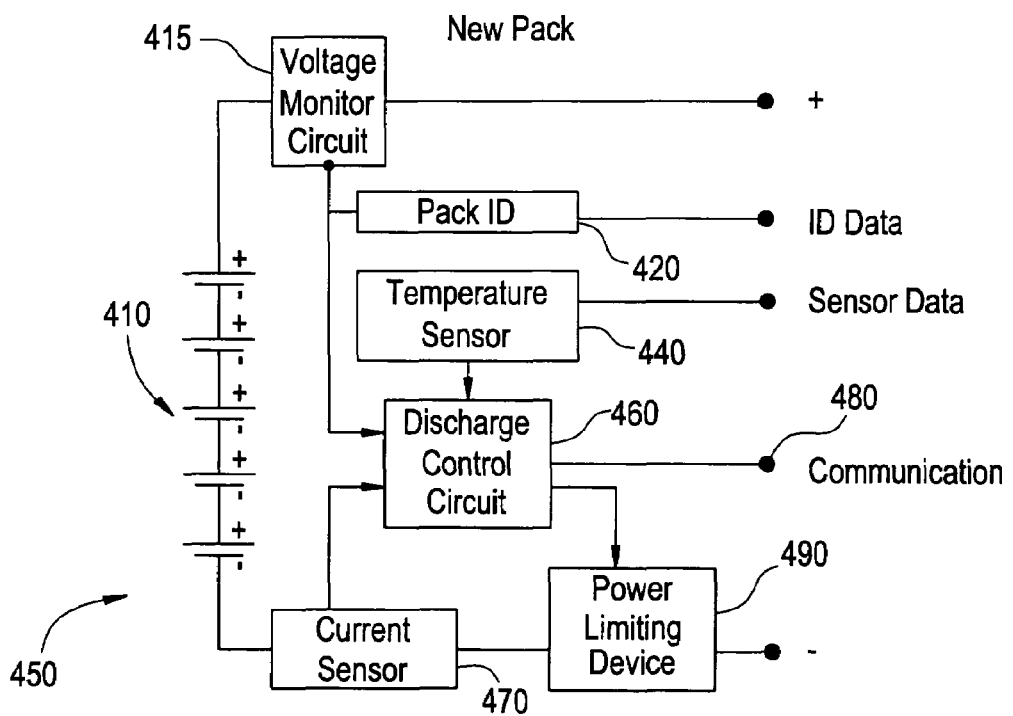
FIG. 4B is a block diagram illustrating an exemplary lower-impedance battery pack in accordance with an exemplary embodiment of the present invention.

FIG. 4A is a block diagram illustrating an existing, standard battery pack, and FIG. 4B is a block diagram illustrating an exemplary lower-impedance battery pack in accordance with an exemplary embodiment of the present invention. Referring to FIG. 4A, the existing, standard battery pack 400 (such as conventional NiCd or NiMH packs currently used in cordless power tool systems) may include a plurality of battery cells 410 which may be connected in series (five shown for simplicity, pack 400 could have greater than five cells). The standard pack 400 may also include a Pack ID 420 connected to an output terminal 430 for identification of the pack 400 when inserted into the charger. The Pack ID 420 may include the model number, version, cell configuration and the battery type, such as lithium ion battery, NiCd battery or NiMH battery, for example. The Pack ID 420 may be embodied as one or more communication codes received from an output terminal 430 of the battery pack by an asynchronous full duplex communication system in the pack 400, such as is described in U.S. Pat. No. 5,680,027 to Hiratsuka et al. However, this is only one example, as the pack ID may also be embodied by an ID resistor, LED display that displays identification data of the pack, serial data sent upon engagement and sensed by the tool/charger, field in a frame of data sent over an air interface to the tool/charger, etc.

The standard pack 400 may further include a temperature sensor 440. The temperature sensor 440 may communicate the temperature inside the battery pack 400 to a connected charger or tool (not shown), for example. As such temperature sensors are known in the art, a detailed explanation of functional operation is omitted for purposes of brevity.

Battery pack 450 depicted in FIG. 4B (lower-impedance pack) may include additional features, and may be part of a cordless power tool system. Thus, lower-impedance battery pack 450 may be applicable to and/or designed for cordless power tool systems comprising at least a cordless power tool, the battery pack and a charger. Pack 450 may be understood as a removable power source for high-power, power tool operations. In an example, battery pack 450 may have a nominal voltage rating of at least 18 volts and/or have a maximum power output of at least about 385 Watts. However, it should be evident to those skilled in the art that the present invention is not necessarily limited to the particular types of tools shown in FIGS. 22-24 nor to specific voltage ratings and/or power output specifications described above.

Pack 450 may be comprised of a plurality of serially-connected cells 410 (five shown for simplicity, pack 450 could have greater than five cells or may be composed of serial strings of cells with the serial strings in parallel with each other). In an example, battery pack 450 may be comprised of at least five serially-connected cells having a Li-ion cell chemistry and so configured that pack 450 may have a nominal voltage rating of at least 18 volts and/or may have a maximum power output of at least 385 Watts. However, pack 450 may be embodied as a pack having another lithium-based chemistry, or as a nickel cadmium, nickel metal hydride and/or lead-acid pack, for example, in terms of the chemistry makeup of individual cells, electrodes and electrolyte of the pack 450.

Five (5) terminals are illustrated for the pack 450 in FIG. 4B, although pack 450 may have fewer or greater then five terminals. Various ones of the terminals may be operatively engaged to corresponding contacts or terminals when the pack 450 is engaged to a power tool or charger, as is known in the art, thus a detailed illustration of the various terminal/contact connections between pack-tool and pack-charger is omitted in FIG. 4B and may be occasionally omitted in certain subsequent figures, except where noted for the purposes of better describing the exemplary embodiments, for the sake of brevity.

In addition to the Pack ID and temperature sensor described above, the lower-impedance battery pack 450 may contain a discharge control circuit 460 capable of monitoring battery voltage (via a voltage monitor circuit 415), battery current (through a current sensor 470), and battery temperature (via temperature sensor 440). Current sensor 470 may be embodied as known components for current sensors, such as a shunt resistor, current transformer, etc. which may provide a signal representing sensed current in pack 450 to discharge control circuit 460. Voltage monitor circuit 415 may be embodied by any known voltage monitor circuit, for example, and may be configured to sense individual cell voltage and/or sense total pack voltage of the string of cells 410 ('stack voltage') to provide a signal representing the individual cell or stack voltage to discharge control circuit 460.

Discharge control circuit 460 may be an intelligent device embodied in hardware or software as a digital microcontroller, a microprocessor such as a Pentium microprocessor chip, an analog circuit, a digital signal processor or by one or more digital ICs such an application specific integrated circuits (ASIC), for example. Pack 450 may also be configured for communicating and sensing information from the attached tool (not shown) through communication terminals 480. In an example, if pack 450 is operatively connected to the first power tool or a power tool configured with intelligence (such as a microprocessor) or other electronic processor, the discharge control circuit 460 of pack 450 may be able to receive, via terminal 480, information related to one or more of a power limit, current limit and/or voltage limitation for the first power tool.

Using combinations of this data, the discharge control circuit 460 may act to place restrictions of the maximum power and current through the battery 450. The discharge control circuit 460 may accomplish this by controlling a power limiting device 490 placed in series with the battery cells 410. The power limiting device 490 may limit current in the battery pack 450 and hence, power out. Power limiting device 490 may also be understood as, and/or occasionally referred to as, one or more of a current limiting means, device or circuit, and/or an impedance matching means, device or circuit. Hereafter, various configurations for providing discharge control for the lower-impedance battery pack 450 are described in further detail.

FIGS. 5A-5E illustrate the use of passive resistance to increase impedance of a lower-impedance battery pack in accordance with an exemplary embodiment of the present invention. FIGS. 5A-5E (and subsequent block or circuit diagrams), may show only a portion of the pack 450 of FIG. 4B to highlight examples of a power limiting device 490 and/or other discharge control features, it being understood that the teachings in these subsequent circuits or block diagrams are applicable to the lower-impedance pack 450 in FIG. 4B. Thus, for the sake of brevity and clarity, FIGS. 5A-5E (and several other subsequent figures), may only show positive and negative terminals of the pack 450 and a single cell 410 (which may represent the serially-connected cells 410 of FIG. 4B), with several of the components in FIG. 4B being omitted for sake of clarity.

The power limiting device 490 as shown in pack 450 of FIG. 4B may be embodied, in one aspect, as a passive resistance device. If it is desired that the lower-impedance battery pack 450 be permanently de-powered for use with existing power tools (i.e., limited to a maximum output current so as not to damage an attached existing power tool that is specifically designed for operation with a conventional battery pack), then the total pack impedance of the lower-impedance battery pack 450 could be raised so as to substantially match the impedance of an existing, standard battery pack (i.e., pack 400) that was designed for the old, existing lines of power tools. Raising the total internal pack impedance of the lower-impedance battery pack decreases both its output power capability and its maximum output current, hence de-powering the lower-impedance battery pack 450 so that it satisfies the design or operating characteristics of the existing (second) power tool.

In an exemplary embodiment, raising the internal impedance of the lower-impedance battery pack 450 may be effected by utilizing passive resistance in the battery pack. For example, a series resistor (FIG. 5A) could be added between one or more battery cells 410 of the lower-impedance battery pack 450 to increase the total internal battery pack impedance. The proposed system may include the added resistance between the series connection of the cells and the positive battery terminal, although it may be added between either the positive or negative terminal connection and the serially-connected cells.

Figure 5A:
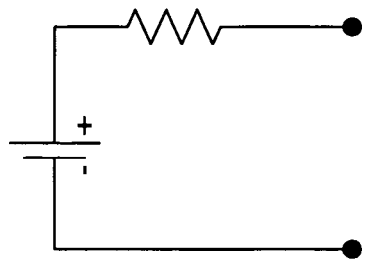
FIGS. 5A-5E illustrate the use of passive resistance to increase impedance of a lower-impedance battery pack in accordance with an exemplary embodiment of the present invention.
Figure 5B:
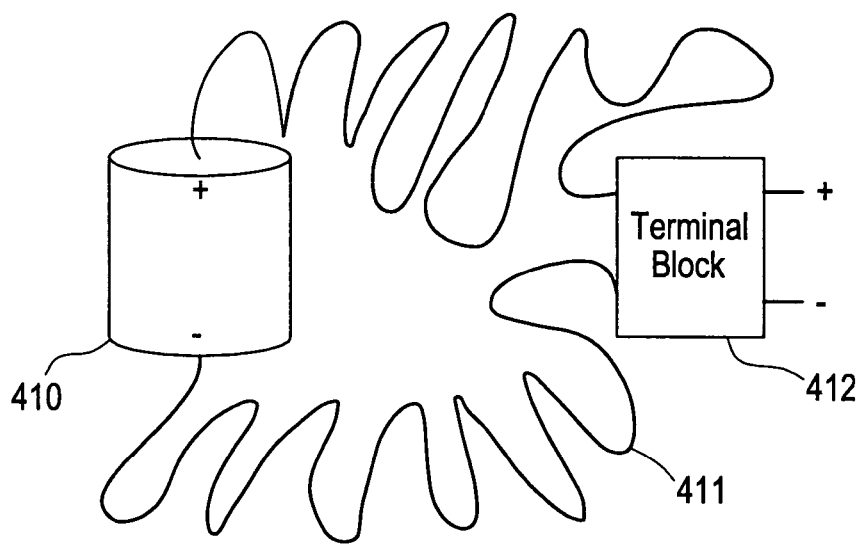
Figure 5C:
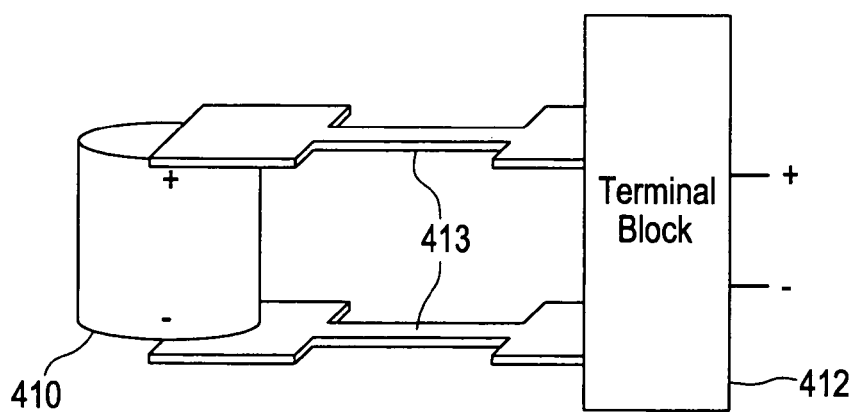

Using a resistor in series as shown in FIG. 5A as the power limiting device 490 is only one method of increasing impedance in the lower-impedance battery pack 450 so as to match impedance characteristics of the standard battery pack, when the lower-impedance battery pack 450 is operatively attached to an existing power tool designed for the standard battery pack. Alternatively, or in addition to adding series resistance, the power limiting device 490 may be realized by lengthening the connecting wires from battery cell to terminal block, so as to increase total pack impedance. As shown in FIG. 5B, connecting wires 411 between one (or more) cells 410 and a terminal block 412 of the battery pack 450 may be substantially lengthened. As a further alternative, battery straps 413 shown in FIG. 5C that connect the individual battery cells 410 of the pack 450 could be modified to increase the total pack impedance. By reducing the cross sectional area of the straps 413, the resistance of the strap increases. Additionally, the strap material may be changed. The strap material typically may be composed of a low resistance material (such as nickel). Instead, the straps may be composed of a less conductive (and hence higher resistance) material such as steel, for example.

Figure 5D:
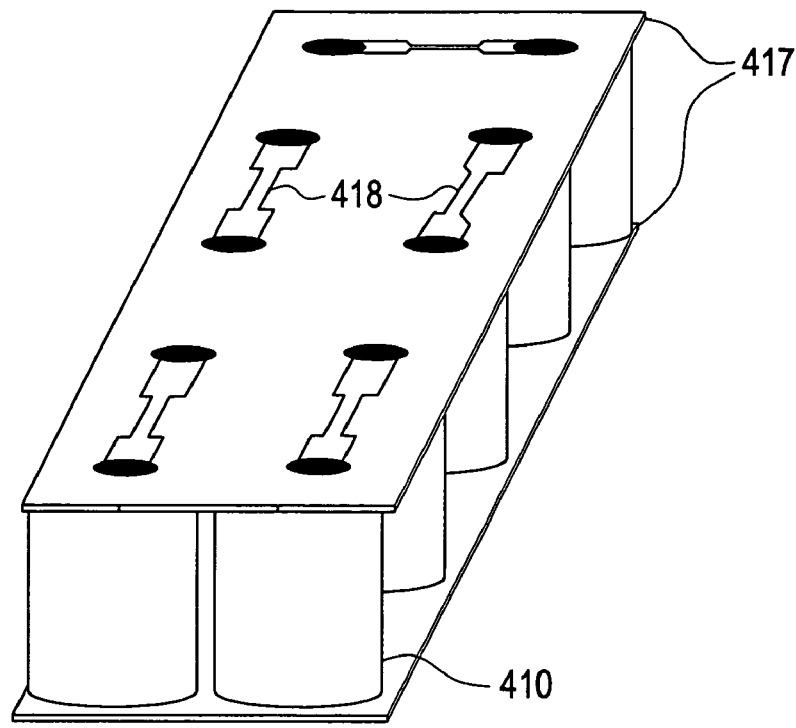
Figure 5E:
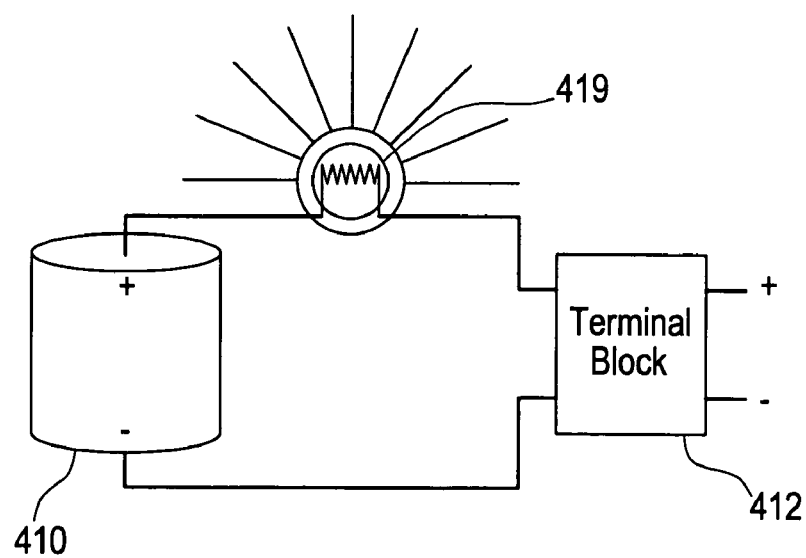

Further, a printed circuit board (PCB) track could be used to increase total pack impedance, as shown as FIG. 5D. In lieu of using battery straps 413, a PCB track 417 may be placed on top of the cells 410 to not only connect the cells 410, but also to add a small impedance through the connecting copper traces 418. Even an illuminating filament 419 in series with the current flow (as shown as FIG. 5E) may increase the total impedance of the pack. The illumination intensity of the filament 419 may also be visible to the user to display the amount of current being used. It should be readily understood that one or more of the passive resistance measures described above in FIGS. 5A-5E could be combined to raise the total pack impedance of pack 450. Each of the above may represent alternative embodiments of a power limiting device 490 which may be used to increase total pack impedance so as to limit power output, for example.

By adding impedance to the lower-impedance cells, the overall system reliability is not diminished by the lower-impedance cells' higher current and greater power capability. Accordingly, discharge control and over-discharge protection for cells of the lower-impedance battery pack may be provided by raising the internal impedance of the lower-impedance battery pack in an effort to reduce the pack's output power capability and maximum output current.

Figure 6:
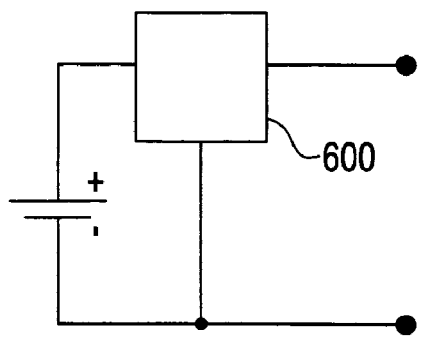
FIG. 6 is a block diagram illustrating the use of active resistance to increase impedance of a lower-impedance battery in accordance with an exemplary embodiment of the present invention.

FIG. 6 is a block diagram illustrating the use of active resistance to increase impedance of a lower-impedance battery in accordance with an exemplary embodiment of the present invention. The power limiting device 490 as shown in pack 450 of FIG. 4B may be embodied by an active resistance device 600. If it is desired that total pack impedance of the lower-impedance battery pack 450 changes as the load changes (i.e., dynamically or adaptively), an active resistance device 600 may be used. For example, and referring to FIG. 6, an active resistance device 600 may be placed between a given cell in the battery pack 450 and the positive terminal, for example. Accordingly, device 600 may be used to increase total pack impedance so as to limit power output. Active resistance device 600 may be embodied as a semiconductor device or other device or circuit with a current limiting function, as generally shown in FIG. 6. Alternatively, the active resistance device 600 may be at least two (or more) semiconductor devices with current limiting function operating in parallel to form a parallel combination in series with at least one of the one or more serially-connected cells. As a further example, there are numerous off-the-shelf semiconductors ("Smart-FET" Technologies) that perform an automatic current limit at fixed or programmable thresholds.

The active resistance device 600 for limiting power output may further be embodied as a Positive Temperature Coefficient (PTC) element or a device which includes a PTC. PTC elements are known as protective elements for controlling the current which flows through circuits to be protected, since their resistance value increases as they give off heat in over-current conditions. For example, PTC thermistors have been used as an over-current protection element. When an electric circuit gets overloaded, conductive polymers of a PTC thermistor, which have PTC properties, emit heat and thermally expand to become high resistance, thereby reducing the current in the circuit to a safe, relatively small current level.

Accordingly, if a PTC device such as described above is connected in series with the battery, the impedance of the PTC device, and hence pack impedance, increases with increasing current. If substantially low impedance is needed and no commercially available single PTC can offer the desired low impedance and/or current capability, then multiple PTC's could be connected in parallel with each other to share the current. It should be readily understood that the active resistance measures described above could be combined in a battery circuit of the low impedance battery pack to dynamically raise the total pack impedance based on load conditions of a given, attached tool. By adding impedance to the lower-impedance cells, the overall system reliability is not diminished by the lower-impedance cells' higher current capability. Discharge control and over-discharge protection may thus be in place for the cells 410 of the lower-impedance battery pack 450.

Figure 7:
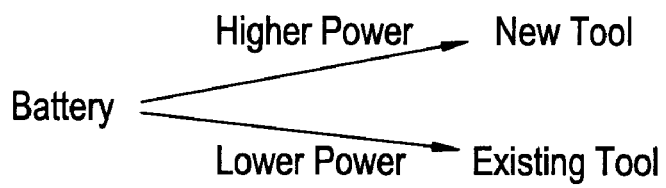
FIG. 7 is a diagram illustrating a basic concept behind a dual-mode battery design in accordance with an exemplary embodiment of the present invention.

FIG. 7 is a diagram illustrating a basic concept behind a dual-mode battery design in accordance with an exemplary embodiment of the present invention. FIG. 7 illustrates a principle that while the lower-impedance battery pack 450 may be desired for use with a new generation of cordless power tools operable at higher currents and/or power levels than are currently available, it should also be useable with existing cordless power tools operating at lower power levels. In other words, the old power tools may need to be protected from excessive currents and/or excessive power levels that could be generated by the lower-impedance battery pack 450 of FIG. 4B. Accordingly, a dual-mode battery design may be desired which allows the lower-impedance battery pack 450 to be useable with both new and old power tools. In an effort to facilitate this dual use, electronic sense mechanisms may be employed.

Figure 8:
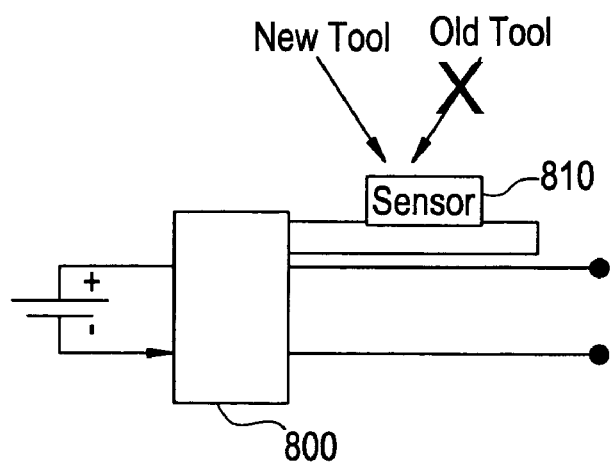
FIG. 8 is a block diagram illustrating a sensor and impedance adding circuit for a lower-impedance battery in accordance with an exemplary embodiment of the present invention.

FIG. 8 is a block diagram illustrating a sensor and impedance adding circuit for a lower-impedance battery in accordance with an exemplary embodiment of the present invention. In an effort to provide a lower-impedance battery pack that may be adapted for use with 'new' and 'old' power tools, Referring to FIG. 8, the lower-impedance battery pack 450 may contain an impedance adding circuit 800 (such as a semiconductor device, for example) that may add series impedance based on a sensed signal received (or lack thereof) from a sensor 810. The sensor 810 may sense the type of tool (new or old) upon engagement with the battery pack and/or as communicated by the power tool, for example, and send the sensed signal directly to impedance adding circuit 800 indicating that a new or old power tool is attached. Thus, the impedance adding circuit 800 is configured to receive the sensed signal from sensor 810 to either add impedance for purposes of limiting maximum current and output power, or to maintain the lower internal impedance of the lower-impedance battery pack 450.

In an alternative, the sensed signal (or lack thereof) may be used by the discharge control circuit 460 of the lower-impedance battery pack 450 (or other intelligent device or microprocessor in pack 450) to control impedance adding circuit 800 for adjusting (or maintaining) the total pack impedance for the battery pack 450. Controlling the impedance of the battery pack 450 allows the benefits of the pack to be maximized in a new cordless power tool base designed for use with pack 450, while preventing over-discharge conditions in the pack from occurring, which could cause corresponding overload damage to the existing or old cordless power tool base.

The sensor 810 may be embodied as a magnetic sensor or an inductive pick-up sensor, for example, which senses signals in the new tools. It is within the scope of the exemplary embodiments of the present invention to use radio frequency (RF) communications and optical sensing as other forms of sensing in order to distinguish whether a new line of tool (cordless power tool adapted for use with the lower-impedance battery pack 450) or older generation of tool (i.e., tool configured for use with the standard pack 400) is being attached to the lower-impedance battery pack 450, for example.

FIGS. 9A and 9B are block diagrams illustrating a thermistor terminal arrangement to determine a desired impedance mode for a given tool in accordance with an exemplary embodiment of the present invention. Both figures show only an abbreviated portion of the circuit of pack 450 for reasons of clarity and/or brevity as previously discussed. FIGS. 9A and 9B include an impedance varying circuit 950 that may change or vary the impedance of the lower-impedance battery pack 450 based on the state of its input, (i.e., the input from a third terminal 940). The third terminal may be embodied as a thermistor terminal 940 of a thermistor 970, for example. The impedance varying circuit 1150 can it be included in, or controlled by, the discharge control device 460 in FIG. 4B.

The tools (new or old) may include a motor 910, semiconductor device 920 and control circuit 930. The semiconductor device 920 in conjunction with the control circuit 930 may enable the tool to be used in variable speed modes, for example. The control circuit 930 may be embodied as a suitable intelligent device such as a microprocessor chip, for example. It is known that such a control circuit 930 in a power tool may detect a trigger switch of the power tool and create a pulse width modulated (PWM) signal that is input to the semiconductor device 920. The PWM signal may turn the semiconductor device 920 on and off rapidly 'pulsing' the device, to create an average voltage across the motor 910 that is lower than the applied battery voltage and proportional to the trigger setting of the power tool. In power tools without variable speed, only the motor 910 is connected to the terminals and there is no need for a semiconductor device 920 and control circuit 930.

Referring to FIG. 9A, when a new tool is attached to the lower-impedance battery pack 450, the third (thermistor) terminal 940 may be 'pulled' to the positive (+) polarity when a trigger or power actuator (not shown) of the tool is operated. The lower-impedance battery pack 450 may further include a sensing circuit 980, which may be embodied as a circuit component of the impedance varying circuit 950, for example, to sense whether the thermistor terminal 940 of the thermistor 970 was pulled high or left open, in order to determine the desired impedance mode for the given tool.

If the battery pack 450 is connected to an old tool, the thermistor terminal 940 is left connected only to the negative battery terminal through the thermistor 970. The voltage on the thermistor terminal 940 will be zero with respect to the battery negative terminal. In an example, the sensing circuit may be a comparator 980. The comparator 980 compares this voltage with a preset reference level 990. Since the thermistor terminal 940 voltage is lower than the reference 990, the comparator output is low (in FIGS. 9A and 9B, L=higher impedance) and this the pack should run as a high impedance pack, causing an impedance device 975 of the impedance varying circuit 950 to add a series resistance so as to raise total internal pack impedance of the pack, thereby limiting output current and hence power. The impedance device 975 of impedance varying circuit 950 may be another example of the power limiting device 490 of FIG. 4B, and may be embodied as one or more of the exemplary embodiments previously discussed (i.e., passive resistance (resistor, lengthened connecting wires, modified straps); active resistance (semiconductor device(s), PTC(s), etc.).

If the battery pack 450 were connected to a new tool as in FIG. 9A, the thermistor terminal 940 is pulled high by terminal 960, which is connected to the battery positive terminal through a tool trigger switch and resistor 965. The resistance divider created by resistor 965 and thermistor 970 creates an elevated voltage at the thermistor terminal 940 which may be greater than the reference voltage 990. The comparator 980 output will thus be high (in FIGS. 9A and 9B, H=low impedance) and activates the pack 450 into the low-impedance mode, in which the impedance device 975 of the impedance varying circuit 950 does not add a series resistance to maintain internal pack impedance at its normal low impedance level.

As discussed above, the sensing circuit 980 could be part of a discharge control circuit 460 shown in FIG. 4B. The sensing circuit only looks at the "state" of the thermistor terminal 940 to set the impedance mode of the battery pack 450. As shown in FIG. 9B, when the pack is connected to an existing tool, the thermistor terminal 940 is not connected to anything. This 'floating' state can be determined by the battery's control circuit, which may (or may not) be part of the discharge control circuit 460, to set the mode to high impedance.

FIGS. 10A and 10B are block diagrams illustrating additional contact arrangements for determining a desired impedance mode for a given cordless power tool in accordance with an exemplary embodiment of the present invention. FIGS. 10A and 10B provide an additional power contact 1005, so that the battery circuit of the lower-impedance battery pack 450 consists of two discharge paths. One path contains an impedance adding circuit 1010, while the other path does not. The tool side of FIGS. 10A and 10B includes motor 910, semiconductor device 920 and control circuit 930 shown previously, illustrating a typical variable speed configuration.

The impedance adding circuit 1010 is another embodiment of a power limiting device 490 of FIG. 4B, and may be embodied as one or more of the exemplary embodiments previously discussed (i.e., passive resistance (resistor, lengthened connecting wires, modified straps); active resistance (semiconductor device(s), PTC(s), etc). The impedance adding circuit 1010 may be under the control of a smart or intelligent processor such as discharge control circuit 460, or may have built-in independent control and intelligence, such as an ASIC, for example.

The lower-impedance battery pack 450 may include additional power contacts, if desired. For example, a system as shown in FIGS. 10A and 10B may be envisioned, with an additional power contact added to the low impedance battery pack 450 in FIG. 10A. With new tools using a direct battery connection, a low impedance source may be achieved. The existing 'old' tools would still make contact with the impedance adding circuit 1010 within the low impedance battery pack 450, and thus be safe from overload because of the added impedance of the impedance adding circuit 1010.

Figure 11A:
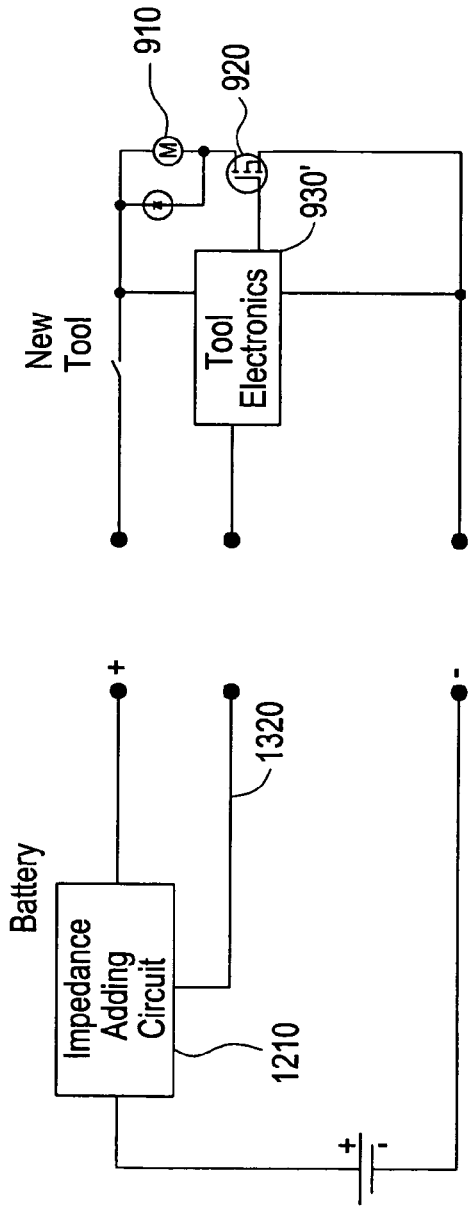
FIGS. 11A and 11B are block diagrams to show a terminal arrangement for selecting a desired impedance mode in accordance with an exemplary embodiment of the present invention.
Figure 11B:
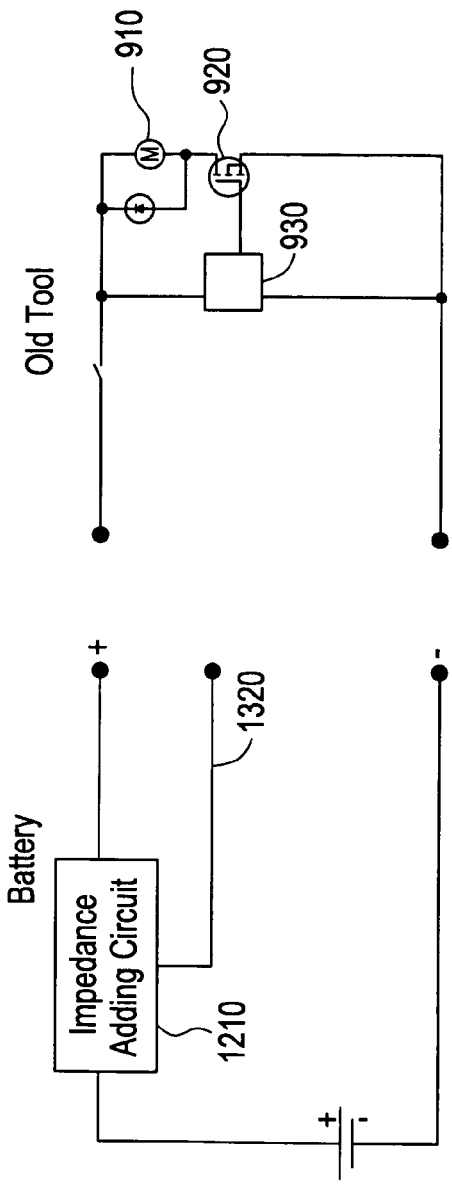

FIGS. 11A and 11B are block diagrams to show a terminal arrangement for selecting a desired impedance mode in accordance with an exemplary embodiment of the present invention. If an additional power contact of FIGS. 10A and 10B proves not to be as feasible as the two-power contact arrangement, then a terminal arrangement as shown in FIGS. 11A and 11B could be employed. The battery pack 450 may contain the same impedance adding circuit 1010 as described above, but may employ a third terminal 1120 as an impedance selection mechanism.

While the previous example of the new tools shown in FIG. 11A uses a thermistor contact voltage to determine the battery impedance mode, FIG. 11A illustrates a communication line 1120 that is arranged between the battery (representative of pack 450) and the power tool. Electronics provided in new or developing generations of cordless power tools may provide a given indicator and/or sense signal via terminal 1120 to the impedance adding circuit 1010 to establish a given impedance mode in the lower-impedance battery pack 450, similar to as described with respect to FIG. 8, for example.

For example, the terminal indicator may be embodied as a simple indicator such as an identification (ID) resistor tied to a specific polarity setting (similar to as described in the thermistor contact of FIG. 11A). Alternatively, the terminal indicator may be implemented as actual communication data within a microprocessor controlled electronic circuit 930' provided in the new tool. The electronic circuit 930' in the new tool would communicate the desired impedance mode of the battery based on the capability of the tool, or motor characteristics of motor 910 such as speed, torque and/or temperature. If the lower-impedance battery pack 450 was connected to an old tool as shown in FIG. 11B, there would be no tool communication over the terminal 1120, thus the impedance adding circuit 1010 defaults to the high impedance mode in the battery pack 450.

Figure 12:
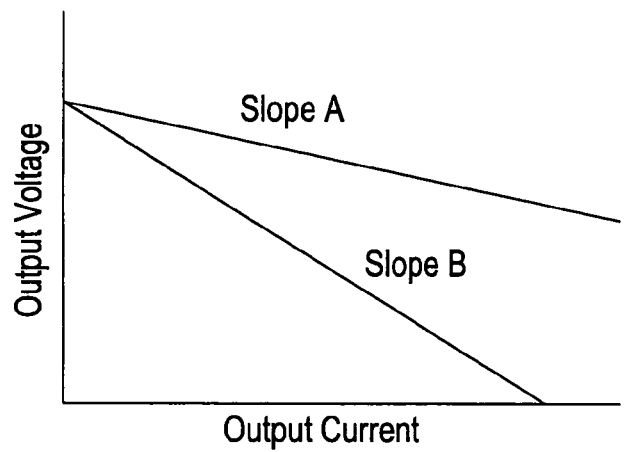
FIG. 12 is a graph of output voltage versus output current to describe the different impedance modes of the battery pack.

FIG. 12 is a graph of output voltage versus output current to describe a current profile for the low and high impedance states of the battery output. In low impedance mode, the current out of the battery cells flows through the motor in the tool and returns back to the battery cells with very little resistance. The battery voltage with respect to battery current will have a Slope A, as shown in FIG. 12. When the pack is in high impedance mode, the increased impedance causes a loss in battery pack performance and the V-I curve will have Slope B.

FIGS. 13A-13D are block diagrams illustrating discharge control in accordance with another exemplary embodiment of the present invention. With the aforementioned techniques describing how to determine the impedance mode, methods of limiting current by controlling total pack impedance of the low impedance battery pack should be evaluated. FIGS. 13A-13D only show an abbreviated portion of an exemplary circuit of the lower-impedance battery pack 450; it being understood that the teachings of FIGS. 13A-13D may be applicable to lower-impedance battery pack 450.

Figure 13A:
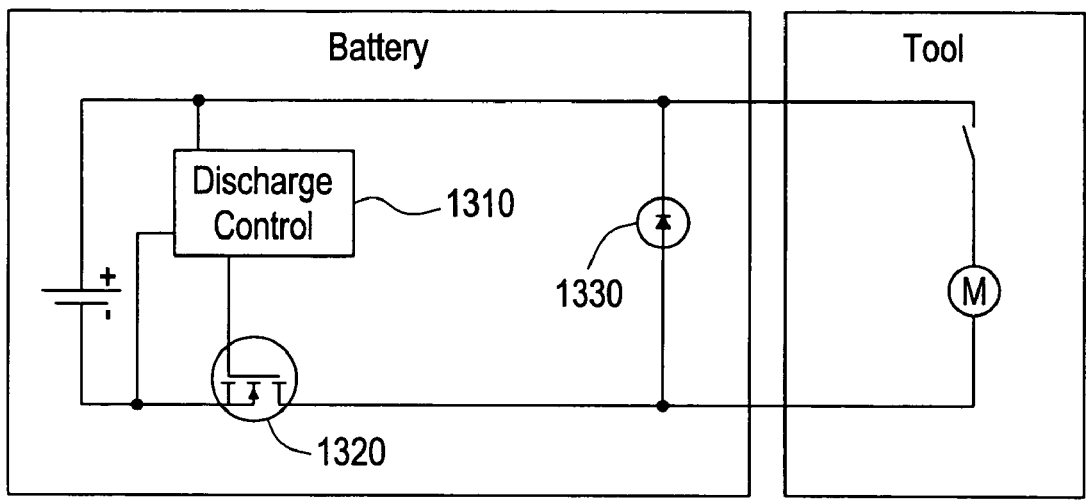
FIGS. 13A-13D are block diagrams illustrating discharge control in accordance with another exemplary embodiment of the present invention.

FIG. 13A illustrates one (or more) battery cells (representing serially-connected cells 410) with output terminals (+, −) for connection to a tool or charger interface (not shown). FIG. 13A includes a semiconductor device 1320 and free-wheeling diode 1330, under the control of discharge control circuit 1310, which can be used to control current, as shown in FIG. 13A. The discharge control circuit 1310 may be analogous to the discharge control circuit 460 of FIG. 4B and may be embodied with intelligence and/or a processing capability, for example.

Semiconductor device 1320 is shown as an N-channel MOSFET; (FET 1320), and occasionally hereafter may be referred to as a 'discharge FET'; however, any semiconductor device capable of passing/blocking current may be utilized for purposes of discharge control in accordance with the exemplary embodiments. In general, in one example, FET 1320 may be set (i.e., at time of manufacture) to turn ON/OFF at given currents, or may receive a control signal from the discharge control circuit 1310 to turn ON or OFF at given current(s), such as when pack current reaches a maximum current threshold.

Further, the FET 1320 may be pulsed to provide an average voltage across the tool motor. When the duty cycle (relationship between operating time and rest time of the motor) is decreased, the average voltage drops and the maximum current capability out of the pack also drops. If the duty cycle of the FET 1320 is increased, the average output voltage would increase and therefore, the maximum current capability would increase as well. In this configuration, the FET 1320 remains fully ON until the current exceeds some upper limit. The discharge control circuit 1310 could then reduce the duty cycle on FET 1320 to decrease the average output voltage provided to the tool motor. This drop in output voltage reduces the output current. The discharge control device 1310 may thus limit the current provided to the tool to some given maximum threshold current value by changing the average output voltage out of the battery pack 450. Since the discharge control can limit current and voltage out of the battery pack, it is effectively controlling the battery' pack's total internal impedance, or 'effective impedance', as seen by the tool. As an example, if the discharge control circuit 1310 is sensing pack current during pack-tool operations, directly or via a signal received from a current sensing device such as current sensor 470 of FIG. 4B, the discharge control circuit 1310 maintains FET 1320 ON until sensed current meets or exceeds a given maximum current threshold. The discharge control circuit 1310 may then pulse width modulate FET 1320 to raise an effective internal pack impedance, as seen by the power tool, until the sensed current has dropped below the given threshold.

Because of the inherent inductance found in most motors, the current cannot change instantaneously when the FET 1320 is turned OFF based on an over-current condition in the pack. A recirculating diode 1330 shown in FIG. 13A allows the motor current to recirculate between negative and positive terminals of the pack and eventually decay to zero or until the FET 1320 is turned back ON (i.e., when current drops below the given threshold so that the over-current condition clears). While the FET 1320 is energized (ON), the diode 1330 blocks any current trying to bypass the tool motor.

Figure 13B:
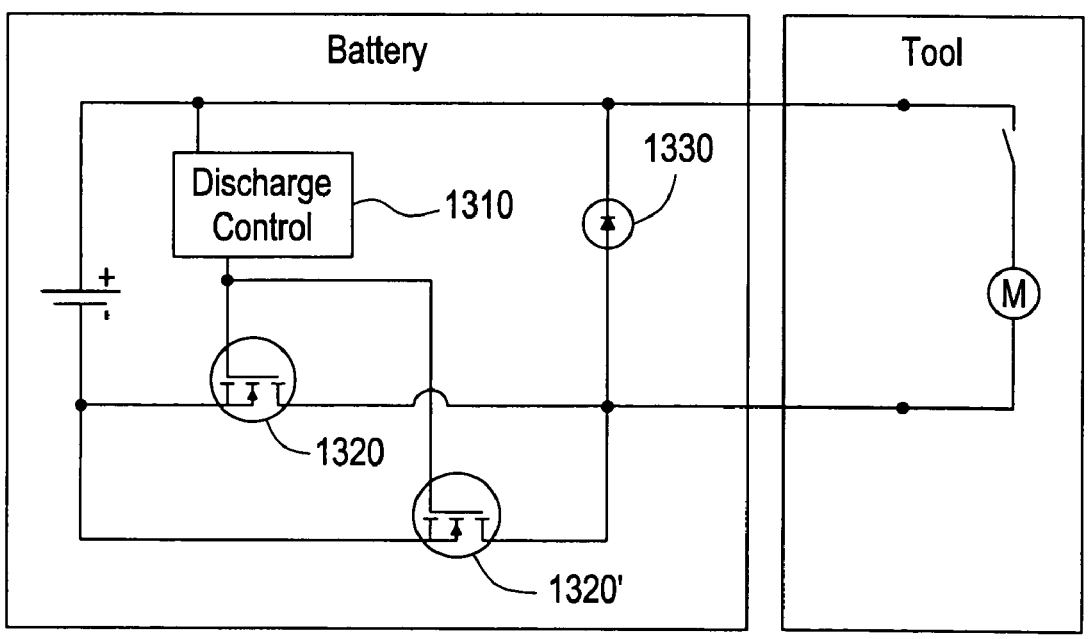

FIG. 13B illustrates shows how multiple FETs 1320, 1320' could be used to help share power dissipation. FETs 1320 and 1320' are shown in a parallel combination that is in series with the battery cells. The FETs 1320, 1320' may be activated at the same time to share the current. During ON state, the power losses are equal to $I^2R$. As two semiconductor devices are in parallel, each device would receive half of the current and one quarter of the power dissipation. That would yield an overall system dissipation of one half the single FET 1320 solution of FIG. 13A.

Figure 13C:
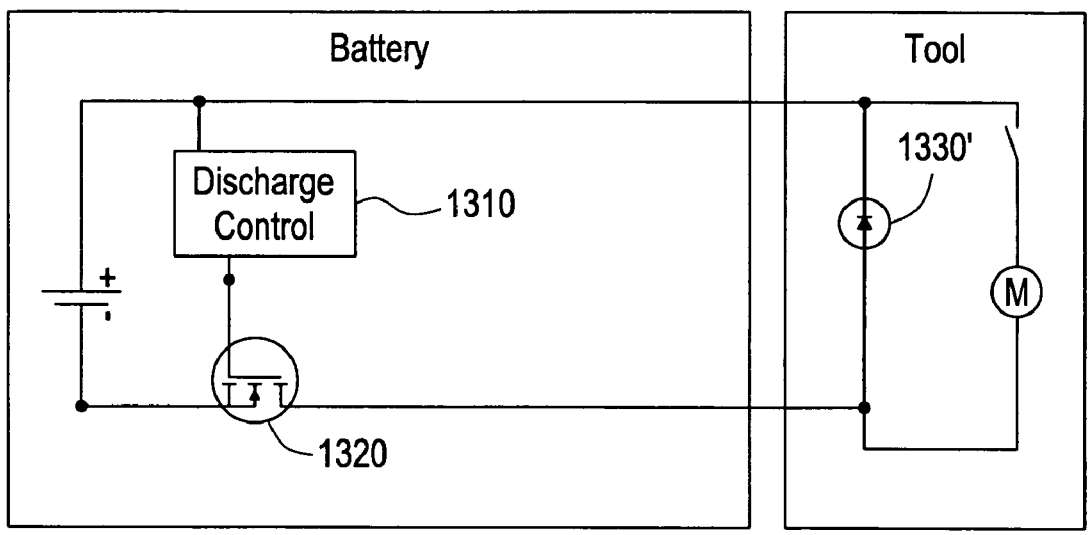

An alternative placement of the diode 1330 in FIG. 13A is shown in FIG. 13C. Here, instead of being placed in the pack, a recirculating diode 1330' could be placed in the tool. Now, the recirculating path is in the tool and thus the power losses are moved out of the pack and into the tool. Similar to FIG. 13A, as FET 1320 is switched OFF based on a sensed over-current condition, the recirculating diode 1330' allows the motor current to recirculate between negative and positive terminals of the tool and eventually decay to zero or until the FET 1320 is turned back ON (i.e., when current drops below the given threshold so that the over-current condition clears). The diodes 1330' forward voltage drop times the current equals its power loss. For example, if the FET 1320 were at 50% PWM conduction with 40 amps in the tool motor, and the forward voltage drop in the diode 1330' was 1 volt, the power loss in the diode 1330' would be 50%*1V*40 A=20 watts. Moving this power out of the battery pack and into the tool may help spread out the heat and/or limit power losses.

Figure 13D:
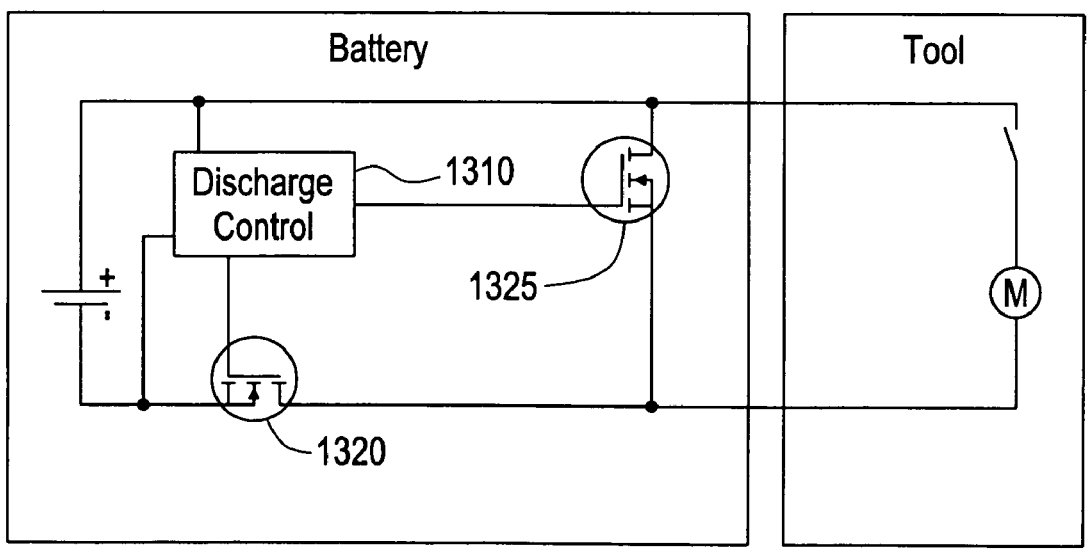

In an effort to reduce power losses even further, the circuit in FIG. 13D could be used. In FIG. 13D, the diode 1330 is replaced by a second FET 1325, referred to as a 'recirculating FET'. This recirculating FET 1325 is activated out of phase from the discharge FET 1320, with the duty cycle of both FETs controlled by the discharge control circuit 1310. The recirculating FET 1325 operates synchronously with the discharge FET 1320. When the discharge FET 1320 is ON, the recirculating FET 1325 is held OFF and current flows across the motor and back to the cells. When the discharge FET 1320 is de-energized (turned OFF), as in the case described with respect to FIG. 13A, where sensed current has met or exceeded a given maximum current threshold, the recirculating FET 1325 is energized ON and the motor current is allowed to recirculate through the recirculating FET 1325 until the current has dropped to a level below the given threshold, after which FETs 1320 and 1325 revert to ON and OFF states respectively, under control of the discharge control circuit 1310. The losses through recirculating FET 1325 may be understood as $I^2*$"On resistance". Using a typical FET resistance, for example, recirculating FET 1325 losses may be 50%*40 $A^2$*0.005 Ohms=4 watts. This power loss is significantly lower than the diode 1330 that dissipated 20 watts as described with respect to FIG. 13A. This process is known as synchronous rectification.

The discharge control circuits 460/1310 have been described as including intelligence. If such intelligence is adapted to monitor the current flowing through the battery cells (via a current sensor 470 as shown in FIG. 4B or directly), then the discharge control circuit 460/1310 could change the impedance dynamically, i.e., "on-the-fly", by switching the semiconductor state of the FETs 1320 (and/or FETS 1320 and 1320'. Accordingly, any of FIGS. 13A-13D may include a current sensor such as sensor 470 shown in FIG. 4B, provided between a terminal of the pack and at least one of the cells for sensing battery current and for outputting a sensed signal to the discharge control circuit 1310.

For example, and when attached to an existing 'old' tool for all normal operations, the battery pack 450 could remain in low impedance mode with the FET(s) 1320 (or 1320 and 1320') in the ON state. Only during stall and start-up conditions (when motor impedance is substantially low and currents get too high) would there be a need to change total internal pack impedance by reducing the PWM duty cycle.

Intelligence in the discharge control circuit 460/1310 (or possibly in a separate battery control circuit, for example) such as a microcontroller or DSP controller) could periodically sense the current through a current sensing device such as the aforementioned current sensor 470 of FIG. 4B (which may be embodied as a shunt resistor or current transformer (not shown), for example) and PWM the FETs 1320 and/or FETS 1320 and 1320' to a lower duty cycle. The average output voltage of the battery pack 450 would suddenly drop which causes the current to drop in the attached tool. The lowered duty cycle would remain in effect until the current drops below a pre-defined or given threshold. The following describes this example in some more detail.

Figure 14:
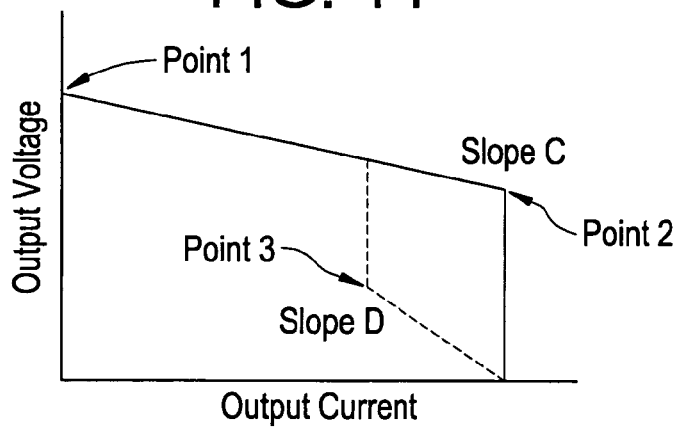
FIG. 14 is a graph of output voltage versus output current to describe a current profile for stall and start-up conditions.

FIG. 14 is a graph of output voltage versus output current to describe a current profile for stall and start-up conditions where the semiconductor device 1320 in FIGS. 13A-D is pulse width modulated. For the following description in FIGS. 14, 16, control is described with respect to FET 1320, it being understood that such is applicable to the multi-FET example of FIG. 13B. For the curve defined by Slope C, the current at point 1 is low. As the load increases, the voltage drops slightly due to the lower pack impedance. At point 2, the current reaches a given current threshold and discharge control begins to PWM the FET. Instantly, the pack voltage is reduced (due to the higher impedance) and limits the stall current. As the load decreases, the output voltage follows Slope D back to some pre-defined threshold. At this point, the FET 1320 is turned on at 100% duty cycle and thereby enables normal low impedance pack operation. To prevent the circuit from oscillating at the cut-off threshold, the current at which the FET 1320 turns back on should be lower than the current at the initial cut-off point. Slope D illustrates a reasonable representation of the path back to normal operation.

Referring to the "knee" of FIG. 14, Slope C at point 2, it is possible that the tool may immediately stall as the PWM is switched in and the average output voltage of the battery drops. Without any warning, the tool would lose power and remain at stall until the load is removed. A user of the tool may not adequately predict this; thus in this case an alternative design may be used.

Figure 15:
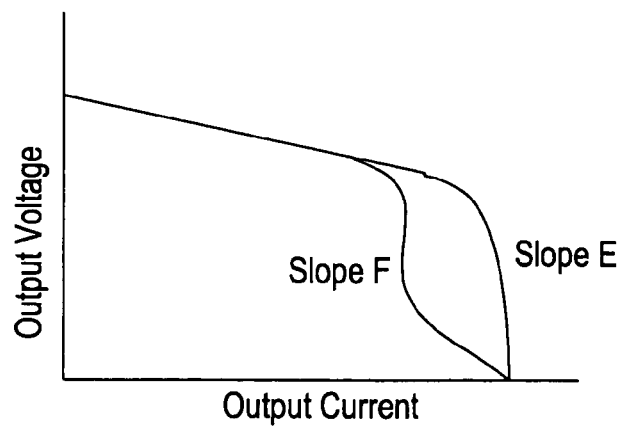
FIG. 15 is a graph of output voltage versus output current to describe a current profile for a gradual change of total pack impedance.

Just before the knee in FIG. 14, the FET 1320 may be pulsed to produce an artificial impedance somewhere between slope C and slope D of FIG. 14. FIG. 15 is a graph of output voltage versus output current to describe a current profile for a gradual change of total pack impedance, and illustrates exemplary current profiles that may be used to gradually change the total internal pack impedance of pack 450 from low to high and back again.

The discharge control described in FIGS. 13A-D performs what is referred to as 'current shaping'. Current shaping may be defined as using active electronic controls to change the V-I curves of a battery output. With current shaping, the battery output of FIG. 14 can be modified to look like the output of FIG. 15. As the current increases, (which may be sensed by a current sensor 470 in communication with discharge control device 1310, for example) the discharge control device 1310 of FIGS. 13A-D may begin to pulse width modulate (PWM) the FET 1320, allowing the voltage to drop somewhere in between slope C and slope D of FIG. 14. The gradual drop in voltage (shown in FIG. 15 slope E) is perceived to the user as a small drop in motor RPM. Typically, a user wanting to avoid stall conditions would back off on the load applied to the tool. Without their knowledge, professional tool users may become innately "tuned" to the motor noise and tend to keep the motor performing at peak power without stalling to motor out.

Figure 16:
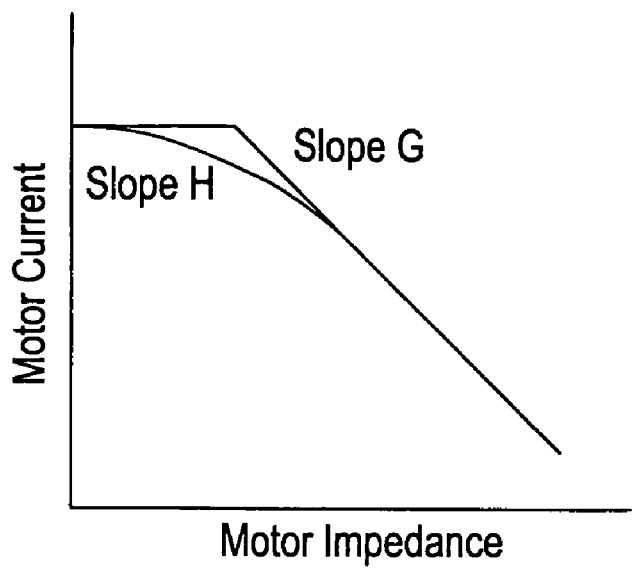
FIG. 16 is a graph of output voltage versus output current to describe current shaping in accordance with an exemplary embodiment of the present invention.

Thus, FIG. 15 illustrates that as sensed pack current approaches a maximum current threshold during pack-tool operations, the discharge control circuit 1310 may pulse width modulates the FET 1320 to selectively reduce the voltage applied to the tool motor, causing a gradual drop in voltage and current out of the pack FIG. 16 is a graph of output voltage versus output current to describe current shaping in accordance with an exemplary embodiments of the present invention. The output current in FIG. 13A-D could also be shaped to have the sharp "knee" as in FIG. 16, at Slope G. This is created by setting a current limit such as the given maximum threshold current value, for example. Any motor impedance that is low enough for an over current condition would cause the immediate drop in average output voltage. The current would remain fixed at some maximum value, regardless of how low the motor impedance drops. If a softer "current shape" is desired, the curve may be rounded to look like Slope H. To round the curve, the average output voltage should be dropped slightly prior to reaching the current limit. By dropping the output voltage before the current limit is reached, the transition between normal ON mode and a current limiting mode (and hence power limiting mode) is softer and less abrupt for the user controlling the tool load.

The circuit in any of FIGS. 13A-13D could also use the FET 1320, (or FETs 1320 and 1320') in a linear mode. For example, the FET 1320 would not be pulsing, but would be partially on. By running in linear mode, the FET 1320 may allow some current to pass while blocking other current at the same time. If a carefully controlled gate voltage is established on the FET 1320, it will act like a resistor and limit the current as the tool approaches, and during, stall conditions. A bipolar transistor may also be used but these devices are controlled with base to emitter currents.

The idea of limiting current, and hence power, may be unnecessary if, once the tool is stalled, the user should turn the trigger off before the tool will start up again. Such an example of this case may be where a circular saw binds to a stall in a piece of wood. If the trigger is held on, the tool will remain stalled and waste energy heating the motor and pack. If, however, the current is turned off once the stall threshold is reached, the user could be forced to release the trigger, remove the saw from the bind, and then re-trigger to start up again. By holding the FET 1320 in FIGS. 13A-13D OFF until the tool trigger is released, the wasted energy during stall is avoided.

Figure 17:
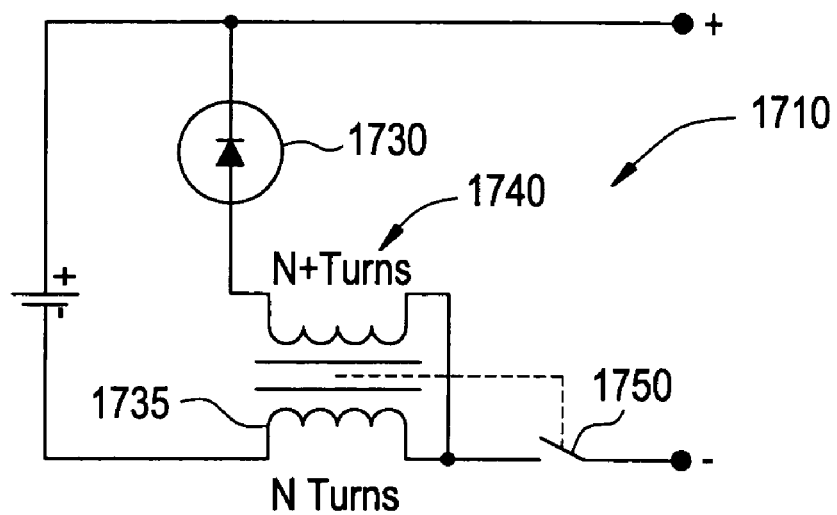
FIG. 17 is a circuit diagram illustrating discharge control in accordance with another exemplary embodiment of the present invention.

FIG. 17 is a circuit diagram illustrating discharge control in accordance with another exemplary embodiment of the present invention. FIG. 17 only shows an abbreviated portion of the circuit of the lower-impedance battery pack 450; it being understood that the teachings of FIG. 17 may also be applicable to lower-impedance battery pack 450. A different alternative that doesn't use semiconductors is a current controlled relay. As will be shown below, the current controlled relay may be arranged in a current path of the pack to provide a current limiting function with hysteresis that limits current out of the pack 450 to a tool motor of an attached power tool.

FIG. 17 shows a discharge control circuit for the pack 450 that may be embodied by a current controlled relay 1710. The current controlled relay 1710 may be composed of two coils, primary coil 1735 and secondary coil 1740, magnetically connected to a switch 1750. The switch is connected in series with the primary coil 1735 and at least one cell (representing cells 410) of the battery pack 450. The switch may have a first state which connects the battery pack to a motor of the tool and a second state which interrupts current to the tool. A free-wheeling diode 1730 is connected between the positive terminal and the secondary coil 1740. In the example of FIG. 17, the primary coil 1735 of N turns may be energized by the current flow.

As is known, current flow through the pack during power operations with the tool creates a magnetic field between the primary and secondary coils 1735, 1740. When the magnetic field is sufficient to activate the switch 1750, the current is diverted through the diode 1730 and secondary coil 1740 with N+ turns. Because the second branch (secondary coil 1740) has more turns, it holds the switch 1750 in that position while the current decays within the battery pack through the diode 1730 and secondary coil 1740. At a second lower threshold, the current through the N+ windings of secondary coil 1740 may have decreased to a point that is not sufficient to hold the switch state of switch 1750, and it returns back to the original state, which connects the battery pack to the tool motor once again. This process thus creates a motor current limit with hysteresis.

Alternatively, if a single-pole double-throw (SPDT) relay is used (an SPDT relay is a general purpose relay for controlling high current draw devices), the same type of circuit could be employed, but with each branch of the relay coil connected to separate contacts. In this alternative embodiment, the large free-wheeling diode 1730 is no longer needed and the design could be simplified.

FIG. 18 is a block diagram illustrating a discharge control of a battery pack in conjunction with speed control of an attached tool in accordance with an exemplary embodiment of the present invention. FIG. 18 only shows an abbreviated portion of the circuit of the lower-impedance battery pack 450; it being understood that the teachings of FIG. 18 may also be applicable to lower-impedance battery pack 450. The discharge control circuit 1815 in FIG. 18 may be embodied a smart or intelligence device similarly to as described for any of discharge control circuits 460 and 1310, for example.

In FIG. 18, variable speed control is shown residing in the battery pack. In particular, a third terminal C may be added to the tool, which may be a tool of the new tool line or an old tool that has been retrofitted with a third terminal C, in order to provide a control signal, via control terminal 1805, to control a FET 1820 in the battery pack. For example, a voltage sense device such as a potentiometer 1810 or similar device in the tool may sense a voltage value that corresponds to a desired speed, and forward a control signal via terminal C and control terminal 1805 to a discharge control circuit 1815 which controls the FET 1820 accordingly. FET 1820 may be pulse width modulated in a manner similar to as described for FET 1320 of FIGS. 13A-D at a duty cycle proportional to the potential at control terminal 1805. By controlling speed of the tool, current from the battery pack and hence discharge rate may be controlled.

FIG. 19 is a block diagram illustrating discharge control of a battery pack in conjunction with speed control of an attached tool in accordance with another exemplary embodiment of the present invention. FIG. 19 only shows an abbreviated portion of the circuit of the lower-impedance battery pack 450; it being understood that the teachings of FIG. 19 may also be applicable to lower-impedance battery pack 450. The discharge control circuit 1915 in FIG. 19 may be embodied a smart or intelligence device similarly to as described for any of discharge control circuits 460, 1310 and 1815, for example.

In FIG. 19 discharge control for the battery pack resides in the battery pack and variable speed control resides in the tool. A switch FET 1920 may be employed with a discharge control device 1915 to control discharge rate of the battery pack, as described in FIGS. 13A-D, for example. A second PWM FET 1912 may be utilized on the tool side to control variable speed of the tool based on the user's desired speed. The tool may include a switch 1925 selectable by the user between ON (bypass position for full speed of tool motor), OFF and VS (variable speed), for example. The control 1910 may be embodied in hardware and/or software, for example. Control 1910 may be embodied as an intelligent processor or pre-configured processing device such as a microcontroller, microprocessor chip, DSP, application specific integrated circuit (ASIC), etc. The control 1910 in the tool senses a desired speed, such as from a trigger operation or speed dial, and varies the duty cycle of the tool PWM FET 1912 to produce the desired motor speed. The tool may also contain a bypass contact 1930 (the switch 1925 is shown in bypass position in FIG. 19). The bypass contact 1930 may be engaged when full speed is desired. Since the tool PWM FET 1912 would be in an ON state at all times, it may be desirable to bypass the FET 1912 entirely. Thus, current will flow through the bypass contact 1930 when the trigger is pulled to the full throw of the trigger, i.e., 100%.

Figure 20:
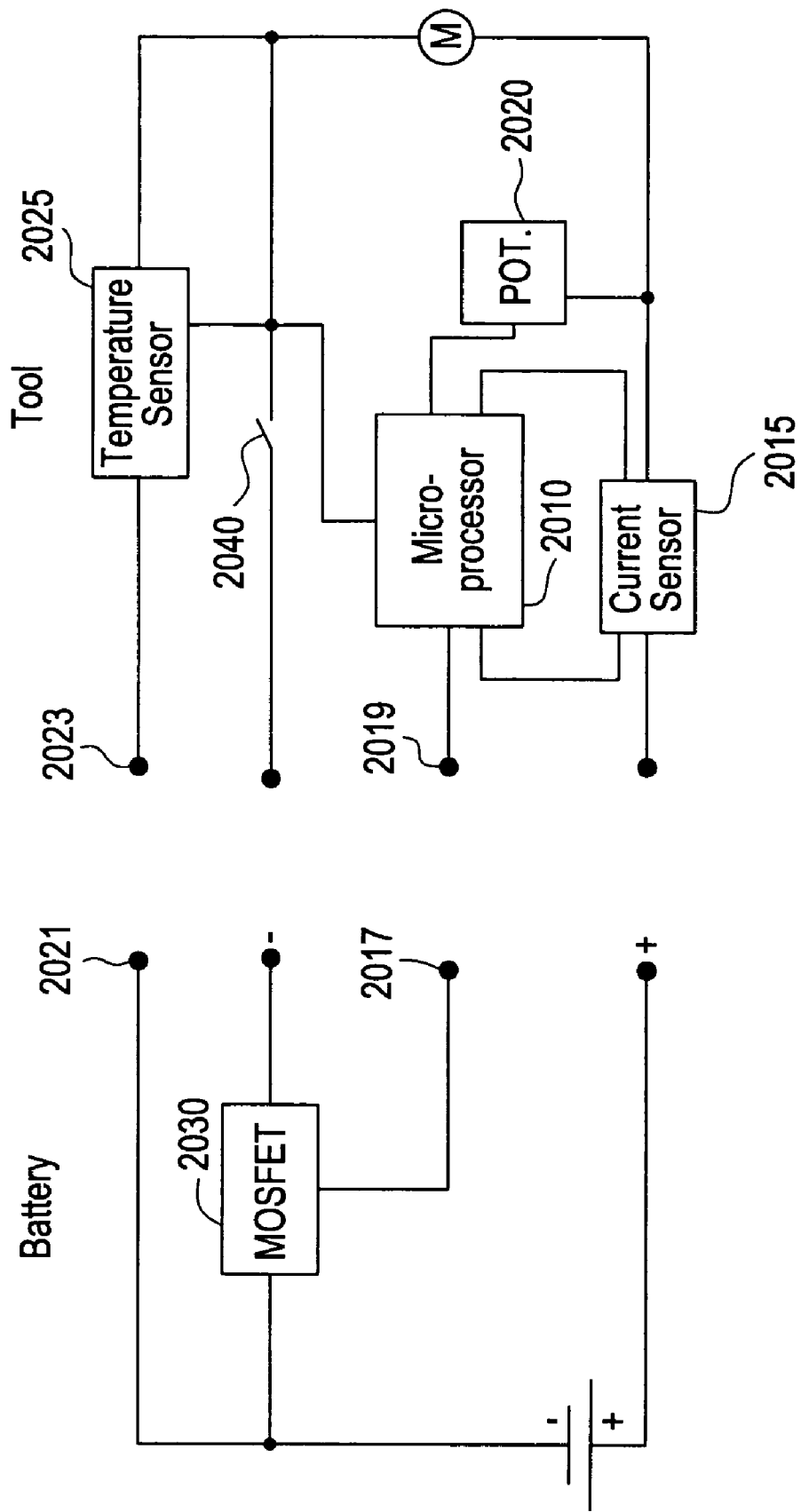
FIG. 20 is a block diagram illustrating discharge control of a battery pack in conjunction with speed control of an attached tool in accordance with another exemplary embodiment of the present invention.

FIG. 20 is a block diagram illustrating discharge control of a battery pack in conjunction with speed control of an attached tool in accordance with another exemplary embodiment of the present invention. FIG. 20 only shows an abbreviated portion of the circuit of the lower-impedance battery pack 450; it being understood that the teachings of FIG. 20 may also be applicable to lower-impedance battery pack 450.

In FIG. 20, speed control and discharge control may be controlled via an intelligent device such as a microprocessor 2010 which resides in the tool. Each of the tool and battery pack illustrate two additional contacts, control terminal 2017 and contact 2021 on the pack, contacts 2019 and 2020 on the tool. The microprocessor 2010 may receive sensing signals from a current sensor 2015 to control current, and hence discharge rate, in the battery pack. The microprocessor 2010 may also receive variable resistance signals from a potentiometer 2020 that may be converted to a voltage value to control speed in the tool. The microprocessor 2010 may further receive a signal from one or more temperature sensors 2025 in the battery pack and/or tool (shown in FIG. 20 on the tool side for convenience) to sense and control the battery pack and/or tool temperature.

As an example of discharge control, if the current sensor 2015 senses battery power (e.g. $I^2/R$) above a given threshold, the current sensor 2015 may send a signal to the microprocessor 2010. The microprocessor 2010 then outputs a control signal, via contact 2019 to control terminal 2017 and hence to FET 2030 such as an N-channel MOSFET), to turn off MOSFET 2030 and thus de-energize the battery pack. The control signal to the MOSFET 2030 may be a signal to turn the FET ON or OFF, as described previously in FIGS. 13A-13D with supporting explanation in the VI graphs of FIGS. 14-15 and/or the motor current versus motor impedance graph of FIG. 16; thus a detailed description of FET operations under the control of microprocessor 2010 is omitted here for the sake of brevity.

For variable speed control, a measured variable resistance from a voltage sense device such as a potentiometer 2020 may be input to the microprocessor 2010 (with suitable A/D conversion, not shown). The microprocessor 2010 can determine the voltage value based on the variable resistance and can control speed accordingly (via a control signal that is sent to the MOSFET 2030). Similarly, based on a value sensed over the path between contacts 2023 and 2021 and sent by temperature sensor 2025, microprocessor 2010 may send a signal to turn off the MOSFET 2030 if the sensed value is outside of a given temperature range, for example. In all cases, a single MOSFET 2030 may be utilized to perform both variable speed control and discharge control.

Additional Over-Discharge Protection

Figure 21:
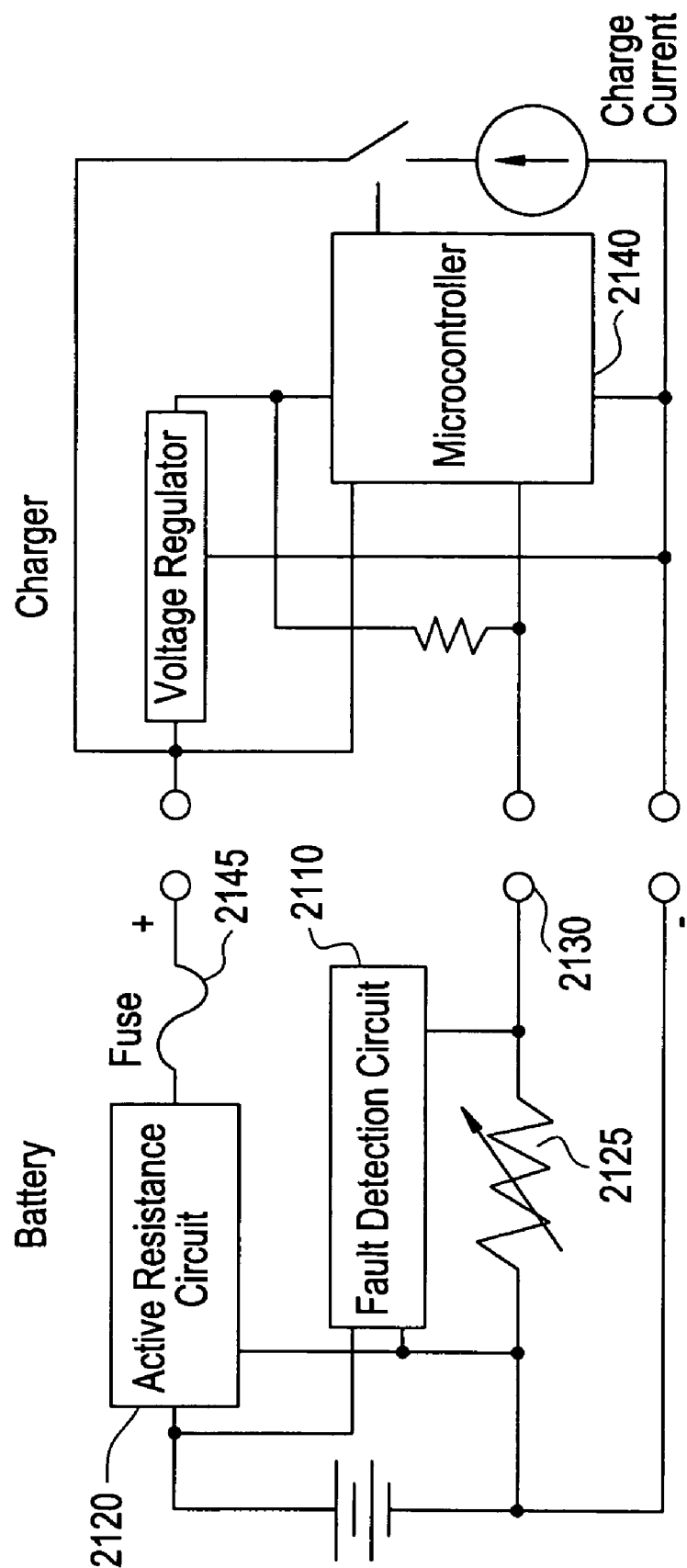
FIG. 21 illustrates a detection circuit for providing overdischarge protection in accordance with an exemplary embodiment of the present invention.

FIG. 21 illustrates a detection circuit for providing over-discharge protection in accordance with an exemplary embodiment of the present invention. Alternatively, if the battery circuitry contains intelligence that can determine that an internal device has failed, the battery pack's intelligence could communicate, to the charger, that it has failed and should not to be charged.

Referring to FIG. 21, the lower-impedance battery pack may have a fault detection circuit 2110 to determine if an active resistance circuit 2120 has failed (i.e., a shorted FET). If a fault is detected, the fault detection circuit 2110 drives a third terminal, which may be embodied as a thermistor terminal 2130 of thermistor 2125 to a high or low electrical state. When the battery pack is placed in the charger, a microcontroller 2140 in the charger senses this high or low state on the thermistor terminal 2130, and prevents the pack from being charged. Likewise, the fault detection circuit 2110 could also drive a terminal 2130, such as a pack ID terminal, to a high or low electrical state during a fault condition. When the battery pack is placed in the charger, a microcontroller 2140 in the charger senses this high or low state on the pack ID terminal, and prevents the pack from being charged.

In another implementation, the fault detection circuit 2110 could communicate a fault condition to the charger using some type of data communications over the thermistor terminal 2130 or the pack id terminal or the positive terminal of the battery pack. A fault condition in the active resistance circuit 2120 could also be detected by the charger sensing that a battery pack fuse 2145 has opened when the battery is inserted into the charger.

The exemplary embodiments of the present invention being thus described, it will be obvious that the same may be varied in many ways. Such variations are not to be regarded as departure from the spirit and scope of the exemplary embodiments of the present invention, and all such modifications as would be obvious to one skilled in the art are intended to be included within the scope of the following claims.

What is claimed is:

1. A battery pack adapted to power a first type of power tool and a second type of power tool configured to operate at a higher power than the first type of power tool, comprising:
    a positive terminal;
    a negative terminal;
    a third terminal adapted to receive a sense signal from the first type of power tool, wherein the third terminal senses a signal from the first type of power tool when the pack is connected to the first type of power tool and the third terminal is open when the pack is connected to the second type of power tool;
    a control circuit operable to identify the type of power tool attached thereto based on a sense signal received via the third terminal; and
    a discharge control circuit operably coupled to the control circuit and operable to selectively control voltage output by the battery pack based on the identified type of power tool.

2. The battery pack of claim 1 wherein the discharge control circuit controls a duty cycle of a semiconductor device disposed in series with a plurality of battery cells.

3. The battery pack of claim 2 wherein the semiconductor device is pulse width modulated field-effect transistor.

4. The battery pack of claim 2 wherein the discharge control circuit controls two semiconductor devices operating in parallel to form a parallel combination in series with the plurality of battery cells.

5. A power tool system comprising:
    a first power tool being of a first type;
    a second power tool being of a second type configured to operate at a higher power than the first type of power tool;
    a battery pack having a plurality of serially-connected battery cells therein and configured to attach to the first power tool and the second power tool, the battery pack including a control circuit operable to identify the type of power tool attached thereto and a discharge control circuit operably coupled to the control circuit and operable to selectively control voltage output by the battery pack based on the identified type of power tool,
    wherein the battery pack having a positive terminal, a negative terminal and a third terminal, the control circuit receives a sense signal via the third terminal from the first type of power tool when the pack is coupled to the first type of power tool and detects an open circuit at the third terminal when the pack is connected to the second type of power tool.

6. The power tool system of claim 5 wherein the discharge control circuit controls a duty cycle of a semiconductor device disposed in series with the plurality of battery cells.

7. The power tool system of claim 6 wherein the semiconductor device is pulse width modulated field-effect transistor.

8. The battery pack of claim 3 wherein the discharge control circuit receives a signal indicative of current output by the battery pack and pulse width modulates a control terminal of the field-effect transistor to gradually reduce the voltage output when the current output approaches a maximum current threshold.

9. A battery pack configured for use with a first type of power tool and a second type of power tool that operates at a higher power than the first type of power tool, comprising:
   a positive terminal;
   a negative terminal;
   a plurality of battery cells coupled between the positive terminal and the negative terminal;
   a third terminal adapted to receive an input from a power tool attached thereto;
   a control circuit operable to identify the type of power tool attached to the battery pack; and
   a discharge control circuit operably coupled to the control circuit and a semiconductor device disposed in series with the plurality of battery cells to set voltage output by the battery pack based on the identified type of power tool, wherein the discharge control circuit receives a signal indicative of current output by the battery pack and pulse width modulates a control terminal of the semiconductor device to gradually reduce the voltage output when the current output approaches a maximum current threshold.

10. The battery pack of claim 9 wherein the control circuit identifies the type of power tool attached to the battery pack based in part on the input received via the third terminal.

11. The battery pack of claim 9 wherein the control circuit receives an input signal via the third terminal from the first type of power tool when the pack is coupled to the first type of power tool and detects an open circuit at the third terminal when the pack is connected to the second type of power tool.

12. The battery pack of claim 9 further comprising a current sensor operably coupled to the discharge control circuit, the current sensor configured to detect the current output by the battery pack.

13. The battery pack of claim 9 wherein the discharge control circuit pulse width modulates a control terminal of the semiconductor device to gradually increase the voltage output after the voltage output has been reduced.

14. The battery pack of claim 9 wherein the discharge control circuit pulse width modulates at a duty cycle of one hundred percent after the voltage output has been reduced and when the current output reaches an intermediate threshold that is less than maximum current threshold.

* * * * *